(12) United States Patent
Kuchi et al.

(10) Patent No.: US 8,902,831 B2
(45) Date of Patent: Dec. 2, 2014

(54) METHODS AND SYSTEMS FOR INTERFERENCE MITIGATION

(75) Inventors: Kiran Kumar Kuchi, Chennai (IN); Deviraj Klutto Milleth Jeniston, Chennai (IN); Vinod Ramaswamy, Chennai (IN); Baskaran Dhivagar, Chennai (IN); Krishnamurthi Giridhar, Chennai (IN); Bhaskar Ramamurthi, Chennai (IN); Padmanabhan Madampu Suryasarman, Chennai (IN); Dileep Manisseri Kalathil, Malappuram (IN)

(73) Assignee: Centre of Excellence in Wireless Technology, Chennai (IN)

( * ) Notice: Subject to any disclaimer, the term of this patent is extended or adjusted under 35 U.S.C. 154(b) by 648 days.

(21) Appl. No.: 12/999,826

(22) PCT Filed: Jun. 17, 2009

(86) PCT No.: PCT/IN2009/000350
§ 371 (c)(1),
(2), (4) Date: Jan. 21, 2011

(87) PCT Pub. No.: WO2009/153808
PCT Pub. Date: Dec. 23, 2009

(65) Prior Publication Data
US 2011/0110304 A1  May 12, 2011

(30) Foreign Application Priority Data

Jun. 17, 2008 (IN) .......................... 1461/CHE/2008
Mar. 4, 2009 (IN) ............................. 472/CHE/2009

(51) Int. Cl.
*H04W 4/00* (2009.01)
*H04L 25/02* (2006.01)
*H04L 5/00* (2006.01)
*H04L 27/26* (2006.01)
*H04L 25/03* (2006.01)

(52) U.S. Cl.
CPC ........... *H04L 5/0023* (2013.01); *H04L 27/2602* (2013.01); *H04L 25/021* (2013.01); *H04L 25/0204* (2013.01); *H04L 27/2621* (2013.01); *H04L 25/03866* (2013.01); *H04L 25/025* (2013.01); *H04L 25/023* (2013.01); *H04L 5/0032* (2013.01); *H04L 5/0048* (2013.01); *H04L 5/0037* (2013.01)
USPC .......... 370/329; 370/204; 370/328; 455/63.1; 455/296; 455/303

(58) Field of Classification Search
None
See application file for complete search history.

(56) References Cited

U.S. PATENT DOCUMENTS 5,867,478 A  2/1999  Baum et al.
6,115,406 A  9/2000  Mesecher (Continued)

OTHER PUBLICATIONS

Yeh, Hen-Geul et al., "A Scheme for Cancelling Intercarrier Interference Using Conjugate Transmission in Multicarrier Communication Systems," IEEE Transactions on Wireless Communications, vol. 6, No. 1, Jan. 2007, pp. 3-7.*

*Primary Examiner* — Donald Mills
(74) *Attorney, Agent, or Firm* — Rahman LLC

(57) ABSTRACT

Embodiments herein provide methods and systems for enhancing interference mitigation using conjugate symbol repetition and phase randomization on a set of subcarriers. The repeated data tone in the signal is complex-conjugated before transmission, when the repetition factor is two. When the repetition factor is greater than two, a combination of conjugate repetition and random/deterministic phase variation of the repeated tones is used to mitigate the interference mitigation. Embodiments further disclose Collision Free Interlaced Pilot PRU Structures that can be used with or without conjugate symbol repetition and phase randomization for interference mitigation.

21 Claims, 29 Drawing Sheets

(56) References Cited

U.S. PATENT DOCUMENTS

| | | |
|---|---|---|
| 6,215,819 B1 | 4/2001 | Hyakudai et al. |
| 6,438,367 B1 | 8/2002 | Crawford |
| 6,990,059 B1 | 1/2006 | Anikhindi et al. |
| 7,292,650 B2 | 11/2007 | Lee et al. |
| 7,711,386 B2* | 5/2010 | Sung et al. ............ 455/522 |
| 8,050,697 B2* | 11/2011 | Jia et al. ............... 455/513 |
| 2002/0191535 A1 | 12/2002 | Sugiyama et al. |
| 2004/0179480 A1 | 9/2004 | Attar et al. |
| 2004/0203809 A1* | 10/2004 | Au et al. ............... 455/450 |
| 2005/0141473 A1* | 6/2005 | Lim et al. ............. 370/342 |
| 2006/0234646 A1* | 10/2006 | Naguib et al. ......... 455/69 |
| 2008/0125154 A1 | 5/2008 | Zirwas et al. |
| 2008/0159196 A1* | 7/2008 | Roh et al. ............. 370/311 |
| 2008/0160921 A1* | 7/2008 | Li et al. ............... 455/67.13 |
| 2008/0233967 A1* | 9/2008 | Montojo et al. ....... 455/452.2 |
| 2008/0233992 A1* | 9/2008 | Oteri et al. ........... 455/522 |
| 2009/0047971 A1* | 2/2009 | Fu ....................... 455/450 |
| 2011/0034192 A1* | 2/2011 | Lim et al. ............. 455/501 |
| 2011/0034206 A1* | 2/2011 | Venkatraman et al. .. 455/522 |
| 2013/0122948 A1* | 5/2013 | Jia et al. ............... 455/501 |

* cited by examiner

Fig. 11

| 1 | X | X | 1 | X | X |
|---|---|---|---|---|---|
| D | D* | D | D* | D | D* |
| D | D* | D | D* | D | D* |
| D | D* | D | D* | D | D* |
| D | D* | D | D* | D | D* |
| D | D* | D | D* | D | D* |
| D | D* | D | D* | D | D* |
| D | D* | D | D* | D | D* |
| X | X | 1 | X | X | 1 |
| D | D* | D | D* | D | D* |
| D | D* | D | D* | D | D* |
| D | D* | D | D* | D | D* |
| D | D* | D | D* | D | D* |
| D | D* | D | D* | D | D* |
| D | D* | D | D* | D | D* |
| X | 1 | X | X | 1 | X |
| D | D* | D | D* | D | D* |

CoFIP PRU Type pk=0

| X | 1 | X | X | 1 | X |
|---|---|---|---|---|---|
| D | D* | D | D* | D | D* |
| D | D* | D | D* | D | D* |
| D | D* | D | D* | D | D* |
| D | D* | D | D* | D | D* |
| D | D* | D | D* | D | D* |
| D | D* | D | D* | D | D* |
| D | D* | D | D* | D | D* |
| 1 | X | X | 1 | X | X |
| D | D* | D | D* | D | D* |
| D | D* | D | D* | D | D* |
| D | D* | D | D* | D | D* |
| D | D* | D | D* | D | D* |
| D | D* | D | D* | D | D* |
| D | D* | D | D* | D | D* |
| X | X | 1 | X | X | 1 |
| D | D* | D | D* | D | D* |

CoFIP PRU Type pk=1

| X | X | 1 | X | X | 1 |
|---|---|---|---|---|---|
| D | D* | D | D* | D | D* |
| D | D* | D | D* | D | D* |
| D | D* | D | D* | D | D* |
| D | D* | D | D* | D | D* |
| D | D* | D | D* | D | D* |
| D | D* | D | D* | D | D* |
| D | D* | D | D* | D | D* |
| X | 1 | X | X | 1 | X |
| D | D* | D | D* | D | D* |
| D | D* | D | D* | D | D* |
| D | D* | D | D* | D | D* |
| D | D* | D | D* | D | D* |
| D | D* | D | D* | D | D* |
| D | D* | D | D* | D | D* |
| 1 | X | X | 1 | X | X |
| D | D* | D | D* | D | D* |

CoFIP PRU Type pk=2

Fig. 13

| 1 | X | X | 1 | X | X |
|---|---|---|---|---|---|
| $D_1$ | $D_1^*$ | $D_{16}$ | $D_{16}^*$ | $D_{31}$ | $D_{31}^*$ |
| $D_2$ | $D_2^*$ | $D_{17}$ | $D_{17}^*$ | $D_{32}$ | $D_{32}^*$ |
| $D_3$ | $D_3^*$ | $D_{18}$ | $D_{18}^*$ | $D_{33}$ | $D_{33}^*$ |
| $D_4$ | $D_4^*$ | $D_{19}$ | $D_{19}^*$ | $D_{34}$ | $D_{34}^*$ |
| $D_5$ | $D_5^*$ | $D_{20}$ | $D_{20}^*$ | $D_{35}$ | $D_{35}^*$ |
| $D_6$ | $D_6^*$ | $D_{21}$ | $D_{21}^*$ | $D_{36}$ | $D_{36}^*$ |
| $D_7$ | $D_7^*$ | $D_{22}$ | $D_{22}^*$ | $D_{37}$ | $D_{37}^*$ |
| X | X | 1 | X | X | 1 |
| $D_8$ | $D_8^*$ | $D_{23}$ | $D_{23}^*$ | $D_{38}$ | $D_{38}^*$ |
| $D_9$ | $D_9^*$ | $D_{24}$ | $D_{24}^*$ | $D_{39}$ | $D_{39}^*$ |
| $D_{10}$ | $D_{10}^*$ | $D_{25}$ | $D_{25}^*$ | $D_{40}$ | $D_{40}^*$ |
| $D_{11}$ | $D_{11}^*$ | $D_{26}$ | $D_{26}^*$ | $D_{41}$ | $D_{41}^*$ |
| $D_{12}$ | $D_{12}^*$ | $D_{27}$ | $D_{27}^*$ | $D_{42}$ | $D_{42}^*$ |
| $D_{13}$ | $D_{13}^*$ | $D_{28}$ | $D_{28}^*$ | $D_{43}$ | $D_{43}^*$ |
| $D_{14}$ | $D_{14}^*$ | $D_{29}$ | $D_{29}^*$ | $D_{44}$ | $D_{44}^*$ |
| X | 1 | X | X | 1 | X |
| $D_{15}$ | $D_{15}^*$ | $D_{30}$ | $D_{30}^*$ | $D_{45}$ | $D_{45}^*$ |

FIG. 14: An example of CDR data allocation in CoFIP Type 0

| 1 | X | X | 1 | X | X |
|---|---|---|---|---|---|
| $D_1$ | $D_{15}^*$ | $D_{16}$ | $D_{30}^*$ | $D_{31}$ | $D_{45}^*$ |
| $D_1^*$ | $D_{15}$ | $D_{16}^*$ | $D_{30}$ | $D_{31}^*$ | $D_{45}$ |
| $D_2$ | $D_{14}^*$ | $D_{17}$ | $D_{29}^*$ | $D_{32}$ | $D_{44}^*$ |
| $D_2^*$ | $D_{14}$ | $D_{17}^*$ | $D_{29}$ | $D_{32}^*$ | $D_{44}$ |
| $D_3$ | $D_{13}^*$ | $D_{18}$ | $D_{28}^*$ | $D_{33}$ | $D_{43}^*$ |
| $D_3^*$ | $D_{13}$ | $D_{18}^*$ | $D_{28}$ | $D_{33}^*$ | $D_{43}$ |
| $D_4$ | $D_{12}^*$ | $D_{19}$ | $D_{27}^*$ | $D_{34}$ | $D_{42}^*$ |
| X | X | 1 | X | X | 1 |
| $D_4^*$ | $D_{12}$ | $D_{19}^*$ | $D_{27}$ | $D_{34}^*$ | $D_{42}$ |
| $D_5$ | $D_{11}^*$ | $D_{20}$ | $D_{26}^*$ | $D_{35}$ | $D_{41}^*$ |
| $D_5^*$ | $D_{11}$ | $D_{20}^*$ | $D_{26}$ | $D_{35}^*$ | $D_{41}$ |
| $D_6$ | $D_{10}^*$ | $D_{21}$ | $D_{25}^*$ | $D_{36}$ | $D_{40}^*$ |
| $D_6^*$ | $D_{10}$ | $D_{21}^*$ | $D_{25}$ | $D_{36}^*$ | $D_{40}$ |
| $D_7$ | $D_9^*$ | $D_{22}$ | $D_{24}^*$ | $D_{37}$ | $D_{39}^*$ |
| $D_7^*$ | $D_9$ | $D_{22}^*$ | $D_{24}$ | $D_{37}^*$ | $D_{39}$ |
| X | 1 | X | X | 1 | X |
| $D_8$ | $D_8^*$ | $D_{23}$ | $D_{23}^*$ | $D_{38}$ | $D_{38}^*$ |

FIG. 15: Another example of CDR data allocation in CoFIP Type 0

|   |   |   |   |   |   |
|---|---|---|---|---|---|
| 1 |   |   |   | 1 |   |
|   |   |   |   |   |   |
|   |   |   |   |   |   |
|   | 1 |   |   |   | 1 |
| 1 |   |   | 1 |   |   |
|   |   |   |   |   |   |
|   |   |   |   |   |   |
|   | 1 |   |   |   | 1 |
| 1 |   |   | 1 |   |   |
|   |   |   |   |   |   |
|   |   |   |   |   |   |
|   | 1 |   |   | 1 |   |
|   |   |   |   |   |   |

FIG. 17B

CoFIP Pilot Type pk=0    CoFIP Pilot Type pk=1    CoFIP Piot Type pk=2

METHODS AND SYSTEMS FOR INTERFERENCE MITIGATION

FIELD OF INVENTION

The embodiments herein generally relate to wireless communication, and, more particularly, to enhancing interference mitigation in wireless communications.

BACKGROUND AND PRIOR ART

Since spectrum is a scarce resource and limited, and therefore, most of the current and emerging broadband wireless networks are expected to re-use the available spectrum in every sector/cell. Therefore, the performance of these types of systems will be limited by co-channel interference caused due to the frequency re-use mechanism. Especially in the existing IEEE 802.16e networks, the cell coverage is mainly limited by the downlink control channel (DL-MAP) coverage. It is determined by the ability of the users to correctly decode the DL-MAP, which carries essential control information such as downlink (DL) allocation and uplink (UL) grant, Multiple Input, Multiple Output (MIMO) schemes, redundancy version for Hybrid Automatic Request (HARQ), pilot format for data resource blocks, etc.

The area coverage probability in 16e type networks is defined as: $P(BLER_{DL-Control-Channel} \leq BLER_{Target})$, where BLER is the block error rate. The target BLER is typically chosen to be around 1%, and to achieve this lower error rate, the DL-MAP is modulated using Rate ½ QPSK (Quadrature Phase Shift Keying) and further repeated 2, 4, or 6 times. In a re-use-1 system deployment, a cell edge user typically receives at least 5 strong interferers (with a C/I of approximately −6 dB), and therefore, data must be repeated at least 6 times to meet the target BLER. Moreover, other link level enhancement techniques such cyclic delay diversity (CDD) and linear Minimum Mean Square Error (MMSE) interference suppression (using 2-antennas at the Mobile Station (MS)) may be required to meet the cell edge coverage requirement. For low frequency selectivity PED-A channel, CDD transmission provides a diversity advantage, and MMSE processing with two receive antennas at the MS provide additional interference cancellation (IC) gain. With 2-antennas, the IC gain will be somewhat limited since the MMSE receiver can cancel at most one co-channel interferer (CCI). Note that the receiver would be able to null all N-interferers only if the MS has at least (N+1) antennas. A significant gain in cell edge coverage can be obtained by suppressing all the CCI in interference limited networks.

Co-channel interference not only limits the control channel coverage, it also limits the spectrum efficiency/throughput of cell edge users. In both IEEE 802.16e and long-term-evolution (LTE) standards, users with low SINR are typically assigned a suitably chosen channel code rate together with simple bit or symbol level data repetition. In some cases, cell edge users are allocated a very low-rate channel code such that the cell edge user will be able to correctly decode its data. If the network has to maintain a certain quality of service (QoS) such as a sustained rate of 500 kbps for any user independent of the location in the cell, a large portion of the total available system bandwidth will be consumed by the cell edge users, which reduces the overall spectrum efficiency.

A contribution (C802.16m-07/211) by Panasonic in the IEEE 802.16m standards proposed that, instead of repeating the data in the DL-MAP at bit level one should repeat the QPSK modulation symbols "n" times and map these repeated data symbols to distinct subcarriers. If all base stations map their repeated data on the same set of subcarriers in a synchronous manner, then a receiver with "Nr" antennas can collect multiple copies of the signal along with interference from the "n" subcarriers of the interfering base stations to generate a total of n*Nr observations. With a repetition factor of n=4, and Nr=2 receive antennas, a total of n*Nr=8 observations can be obtained, and it can be used to potentially reject n*Nr−1=7 interferers.

A conventional maximum ratio combing (MRC) receiver provides a 3-dB SNR advantage with a repetition factor of two or in general, the SNR gain will be 10 Log(n) dB. The conventional receiver also provides an additional diversity gain when the subcarriers are sufficiently spaced apart in a frequency selective channel.

However, an MMSE receiver which jointly filters using MMSE weights will completely suppress the interference, if the subcarriers on which the data is repeated experience different channel gains. In other words, the channel should have high enough frequency selectivity. In Rician, line-of-sight, or flat fading channels, the channel will have limited or no variation across subcarriers resulting in incomplete suppression of the interference. It can be easily shown that the MMSE receiver will not be able to suppress the interference.

The techniques proposed in prior art requires the propagation channel on which the data is repeated to be distinct. In addition, this technique repeats the data tones sufficiently far apart in frequency. Therefore, the method proposed in prior art will not provide much advantage in Rician, line-of-sight, or flat fading channels. Moreover, if the data has to be repeated on distinct subcarriers which are spaced far apart in frequency, active co-ordinated transmission among different base station becomes difficult especially if the data payload in each BS is different. Because of these requirements, the prior art techniques is unsuitable for implementation in existing wireless networks such as IEEE 802.16m or LTE.

SUMMARY OF INVENTION

In view of the foregoing, an embodiment herein provides a method of enhancing interference mitigation in a wireless telecommunication network, the method comprising repeating incoming modulation symbols over one or more subcarriers; encoding repeated symbols using a combination of complex conjugation and phase variation, wherein the encoding of repeated symbols is synchronized across multiple spatially separated transmitters; and transmitting the repeated and encoded symbols in each of said multiple spatially separated transmitters in a synchronized transmission.

Another embodiment herein provides a method of enhancing interference mitigation in a wireless telecommunication network, the method comprising repeating incoming modulation symbols over a first subcarrier and a second subcarrier; complex conjugating the repeated modulation symbols over the second subcarrier, wherein the complex conjugating is synchronized in multiple spatially separated transmitters; and transmitting the repeated symbols over the first subcarrier and the second subcarrier in each of said multiple spatially separated transmitters in a synchronized transmission.

Another embodiment herein provides a transmitter in a wireless telecommunication network for enhancing interference mitigation, the transmitter configured to repeating incoming modulation symbols over one or more subcarriers; encoding repeated symbols using a combination of complex conjugation and phase variation, wherein the encoding of repeated symbols is synchronized in multiple spatially separated transmitters; and transmitting the repeated and encoded symbols in each of said multiple spatially separated transmitters in a synchronized transmission.

Another embodiment herein provides a method of enhancing interference mitigation in a wireless telecommunication network, the method comprising assigning a unique pilot pattern corresponding to a sector number of a sector such that no two sectors with different sector numbers have pilots in same location in their respective pilot patterns, wherein the pilot pattern comprises of pilot tones and null tones; repeating data symbols over one or more subcarriers; encoding the repeated data symbols using a combination of complex conjugation and phase variation, wherein the encoding of repeated data symbols is synchronized in multiple spatially separated transmitters; and transmitting the repeated and encoded symbols in each of said multiple spatially separated transmitters in a synchronized transmission.

Another embodiment herein provides a method of enhancing interference mitigation in a wireless telecommunication network, the method comprising assigning a unique pilot pattern corresponding to a sector number of a sector such that no two sectors with different sector numbers have pilots in same location in their respective pilot patterns, wherein the pilot pattern comprises of pilot tones and null tones; repeating data symbols over a first subcarrier and a second subcarrier; complex conjugating the data symbols over the second subcarrier, wherein the complex conjugating is synchronized in multiple spatially separated transmitters; and transmitting the symbols over the first subcarrier and the second subcarrier in each of said multiple spatially separated transmitters in a synchronized transmission.

Another embodiment herein provides a transmitter in a wireless telecommunication network for enhancing interference mitigation, the transmitted configured to assigning a unique pilot pattern corresponding to a sector number of a sector such that no two sectors with different sector numbers have pilots in same location in their respective pilot patterns, wherein the pilot pattern comprises of pilot tones and null tones; repeating data symbols over one or more subcarriers; encoding the repeated data symbols using a combination of complex conjugation and phase variation, wherein the encoding of repeated data symbols is synchronized in multiple spatially separated transmitters; and transmitting the repeated and encoded symbols in each of said multiple spatially separated transmitters in a synchronized transmission.

Another embodiment herein provides a method of encoding a signal in a wireless telecommunication network, the method of encoding comprising having a number of PRU structures equaling the number of sectors in a cell, each structure comprising a grid of subcarriers and symbols, the method comprising having pilot tones in a set of symbols such that no two PRU structures have pilot tones at the same location in corresponding set of symbols in other PRU structures; and having null tones in the set of symbols in locations occupied by pilot tones of other PRU structures.

Another embodiment herein provides a method of encoding a signal in a wireless telecommunication network, the method of encoding comprising having a number of PRU structures equaling the number of sectors in a cell, each structure comprising a grid of subcarriers and symbols, the method comprising having pilot tones in a set of symbols such that no two PRU structures have pilot tones at the same location in corresponding set of symbols in other PRU structures; having null tones in the set of symbols in locations occupied by pilot tones of other PRU structures; repeating data symbols over one or more subcarriers; and encoding the repeated data symbols using a combination of conjugate symbol repetition and phase variation.

Another embodiment herein provides a method of decoding received signals by a receiver having one or more antennas, the signals encoded using a combination of conjugation and phase variation, the method comprising receiving one or more control messages to identify subcarriers that have symbols encoded with a combination of conjugation and phase variation in received signals through the one or more antennas; decoding the signals using a combination of conjugation and phase variation on the identified subcarriers; filtering the signals from the one or more antennas to obtain a decision metric for demodulation; and demodulating the signals to obtain original data.

Another embodiment herein provides a receiver, having one or more antennas, the receiver configured to decode received signals encoded using a combination of conjugation and phase variation, the receiver decoding the signals using a method comprising receiving one or more control messages to identify subcarriers that have symbols encoded with a combination of conjugation and phase variation in received signals through the one or more antennas; decoding the signals using a combination of conjugation and phase variation on the identified subcarriers; filtering the signals from the one or more antennas to obtain a decision metric for demodulation; and demodulating the signals to obtain original data.

Another embodiment herein provides a method of enhancing interference mitigation in a wireless telecommunications network comprising at least a plurality of spatially separated transmitters, the method comprising receiving quality metric data from users; identifying regions and users that require interference mitigation; and transmitters using a combination of complex conjugate repetition and phase variation to enhance the performance in identified regions.

Another embodiment herein provides a wireless telecommunications network comprising at least a plurality of spatially separated transmitters configured to: receiving quality metric data from users; identifying regions that require interference mitigation; and using a combination of complex conjugate repetition and phase variation to enhance the performance in identified regions.

Another embodiment herein provides a wireless telecommunications network comprising at least a plurality of spatially separated transmitters configured to receiving quality metric data from users; forwarding the quality metric data to a master controller; receiving notification relating to the regions that require interference mitigation; and using a combination of complex conjugate repetition and phase variation to enhance the performance in identified regions, and a master controller configured to receiving quality metric data from users through the plurality of spatially separated transmitters; identifying regions that require interference mitigation; and notifying the transmitters about regions that require interference mitigation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein will be better understood from the following description with reference to the drawings, in which:

FIG. 11 illustrates Collision Free Interlaced Pilot PRU Structure for 1 pilot stream according to an embodiment herein;
FIG. 13 illustrates CDR encoding with Collision Free Interlaced Pilot PRU Structure for 1 pilot stream according to an embodiment herein;
FIG. 14 shows an example of CDR data allocation in CoFIP Type 0 according to an embodiment herein;
FIG. 15 shows an example of CDR data allocation in CoFIP Type 0 according to an embodiment herein;
FIG. 17B shows a PRU structure with 12-pilots according to an embodiment herein.

DEFINITIONS

CDR: CDR refers to the concept of encoding signals using a combination of conjugate data repetition and phase variations in order to enhance interference mitigation as disclosed herein.
CoFIP: CoFIP refers to the collision free interlaced pilot designs for reducing pilot interference, and for enabling measurement of interference statistics at the receiver as disclosed herein.
Pilot-on-Pilot: Mode of choosing pilot structures in which same PRU type and same pilot structure is chosen in all cells as disclosed herein.
Combination of conjugation and phase variation: refers to using conjugation alone when repetition is two and using conjugation and phase variation when repetition is more than two in accordance with the embodiments disclosed herein.
Conjugation: refers to the process of complex conjugation. The phrases "conjugation" and "complex conjugation" are used interchangeably throughout the specification.

DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
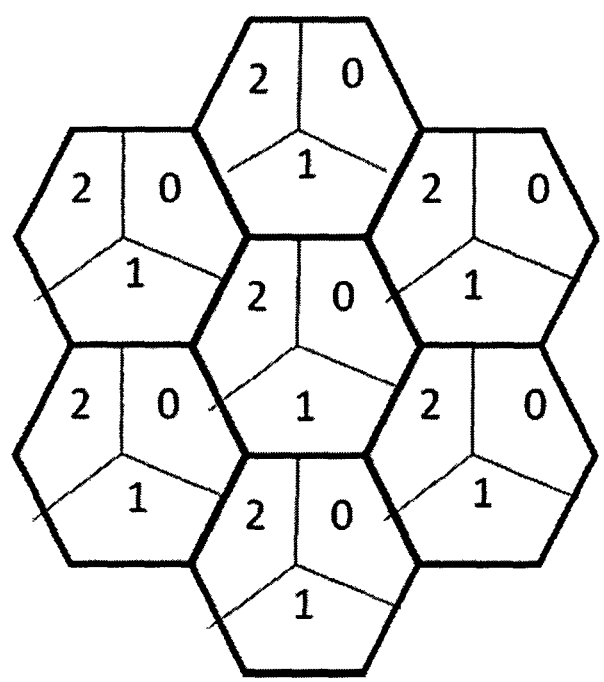
FIG. 1 shows a cellular system with 3-sectors per cell.

A wireless network generally comprises of many smaller cells. Each cell is further divided in to multiple sectors. Each cell/sector may have a base station (BS) and multiple mobile stations (MSs). Cellular system with 3-sectors per cell is depicted in FIG. 1. The MSs in a sector may be fixed, nomadic or mobile. Communication from a BS to an MS is called as downlink or forward link. Similarly, communication from an MS to a BS is called as uplink or reverse link.

Figure 2:
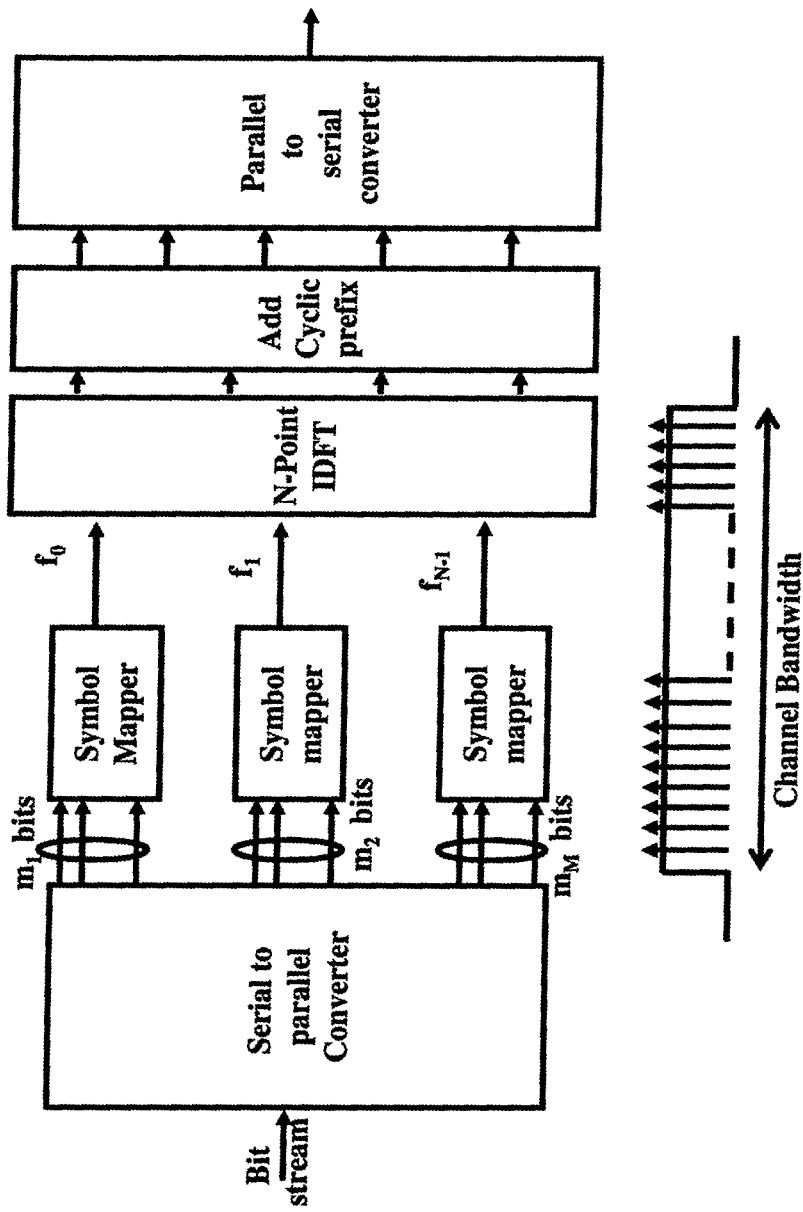
FIG. 2 illustrates an OFDMA based system.

The IEEE 802.16e Wireless Metropolitan Area Network (MAN) is a broadband wireless standard that uses Orthogonal Frequency Division Multiplexing Access (OFDMA) technology for both downlink and uplink transmissions. The block diagram of an OFDMA based system is shown in FIG. 2. However, 3GPP-LTE (Long Term Evolution) is a broadband wireless standard that uses OFDMA in the downlink, and a variant of OFDMA called as Discrete Fourier Transform (DFT)-spread-OFDMA also known as single-carrier FDMA (SC-FDMA) in the uplink. In these multi-user systems, resource is allocated to an MS or a group of MSs in time and frequency dimensions, where the basic signal is confined to one OFDM symbol that spans $N_u$=N−G used subcarriers spanning $X_u$=X−g MHz usable bandwidth, where N is the Discrete Fourier Transform (DFT) size (total number of available subcarriers), G is the total number of guard subcarriers on either side, X is the channel bandwidth and "g" is the total width of the guard bands. The guard band is required to meet the spectral mask defined by the regulatory agencies in different regions/countries around the world.

Moreover, OFDMA in IEEE 802.16e or SC-FDMA in LTE the guard band is allowed by leaving out a total of G subcarriers at the either side of the band after expanding X to $X_o$=$\rho_o$X MHz using an oversampling factor $\rho_o$ (say $\rho_o$=8/7 or $\rho_o$=28/25 in IEEE 802.16e depending on the value of X. Note that $\rho_o$ will be always greater than unity, and hence the name oversampling,) to meet the spectrum mask. The guard band G is chosen in such a way that the total usable bandwidth is $X_u$ MHz. Since guard subcarriers are left out after oversampling, the spacing between the subcarriers in OFDMA or SC-FDMA will be $\Delta f_1$=$X_o$/N and the OFDM symbol duration will be 1/$\Delta f_1$.

Figure 3:
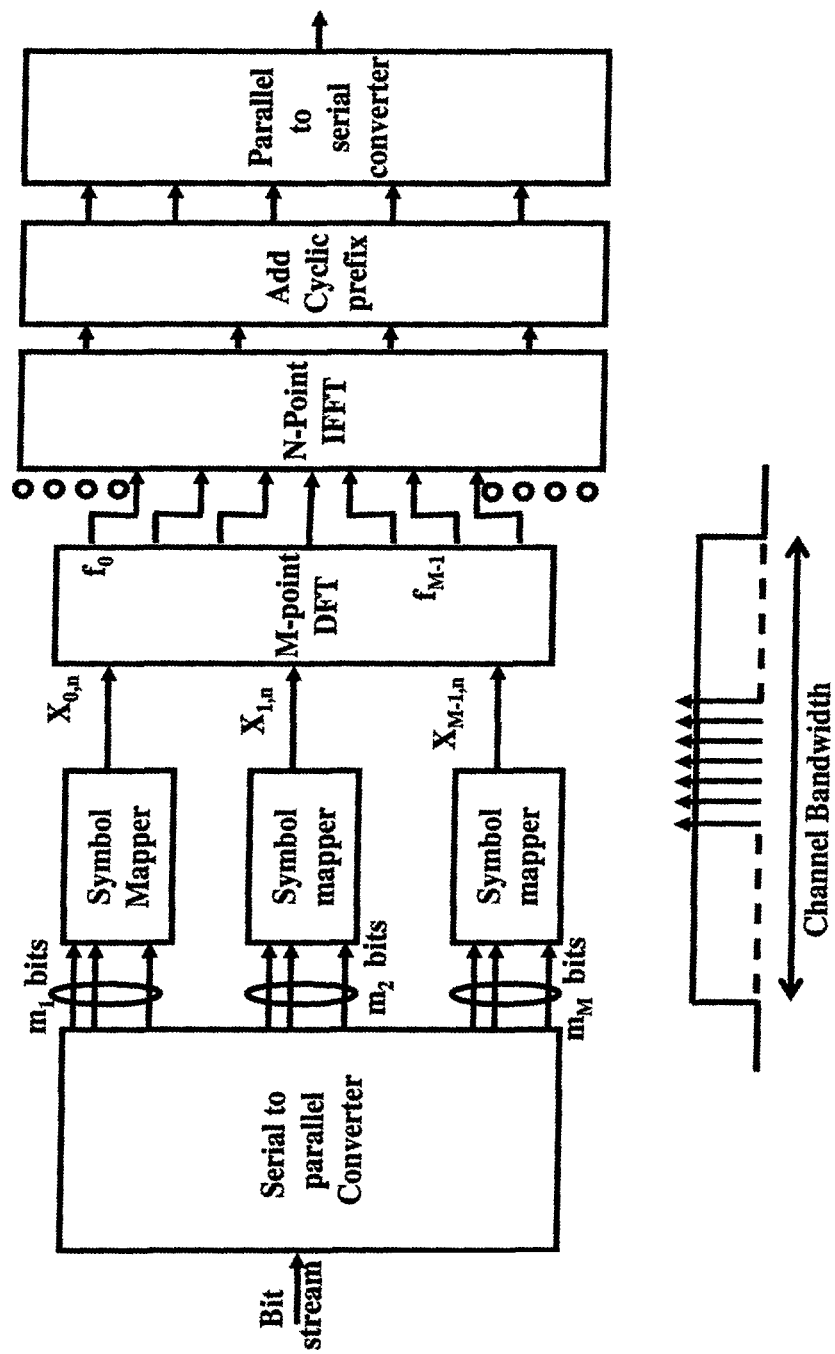
FIG. 3 illustrates a Localized SC-FDMA based system.
Figure 4:
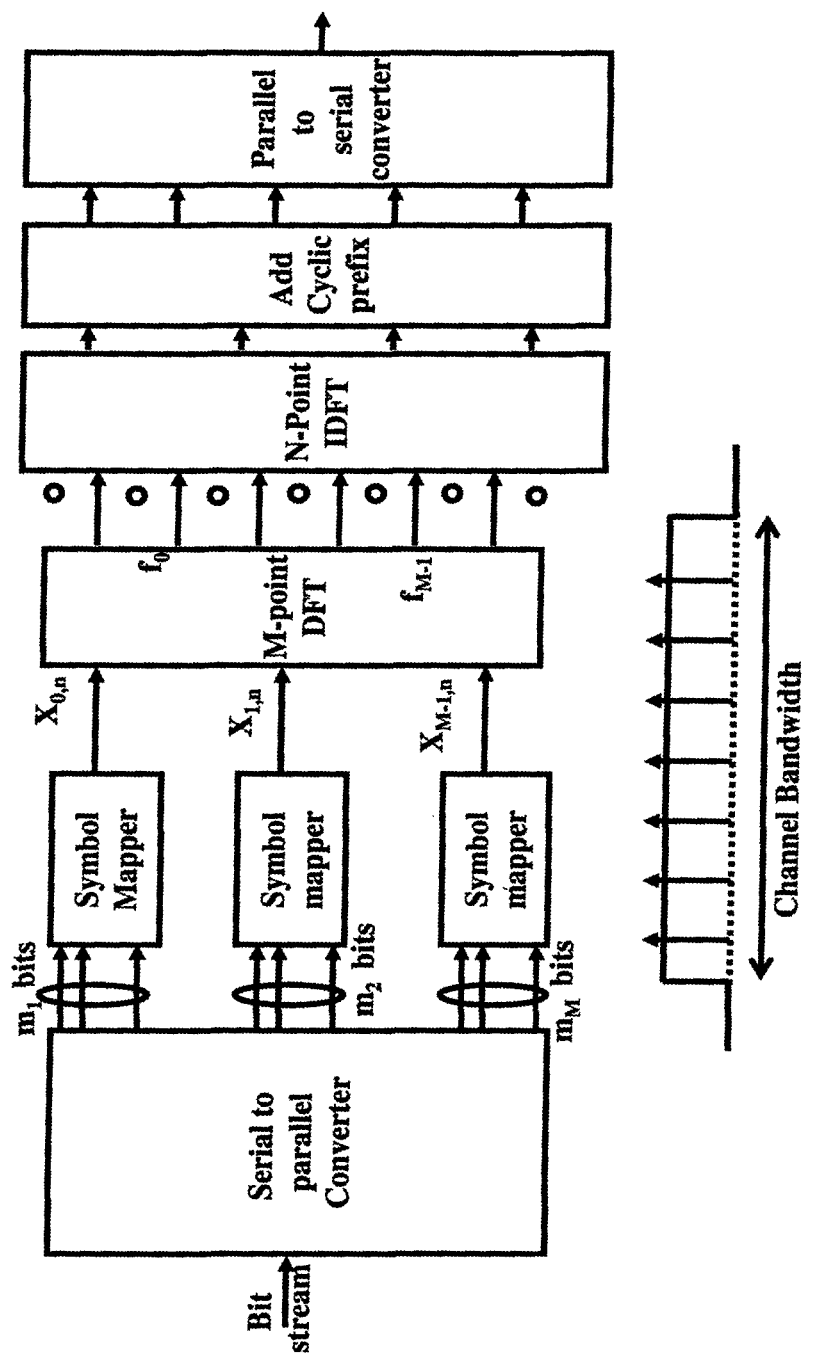
FIG. 4 illustrates a Distributed SC-FDMA based system.

The frequency domain transmitter implementations of localized and distributed SC-FDMA system using the DFT-spread OFDMA framework are shown in FIGS. 3 and 4 respectively. In these cases, an M-point DFT is applied to the PSK/QAM input data and the outputs of the FFT are mapped to distinct subcarriers, and filled with zeros in the unused subcarriers before taking an N-point inverse IDFT (IDFT) with N>M. The mapping of subcarriers can be either localized as in FIG. 3 or distributed as in FIG. 4.

The basic unit for transmission can be termed as a slot, or resource block (RB) or a physical resource unit (PRU), which is composed of P subcarriers and Q OFDM symbols. Data is allocated in terms of slots which are either contiguous (localized) or scattered (distributed) in a two dimensional time-frequency grid that contains N subcarriers and M OFDM symbols where (N>>P and M>>Q). P and Q may be greater than one. Each slot is designated by the two dimensional index (p,q), where p is the slot index along the frequency axis with p=1, 2, . . . Nf and q is the slot index along the time axis with q=1, 2, . . . Nt, where Nt is equal to the total number of slots in time axis, Nf is equal to the total number slots in frequency axis, and Nt×Nf is equal to the total number of allocated slots. For example slot (1,1) and (1,2) are two adjacent slots in time and slot (1,1) and (2,1) are two adjacent slots in frequency. The size of the basic resource unit in the uplink can be same or different from that of the downlink.

In IEEE 802.16m the basic resource unit (RU) is called RB or PRU whereas in LTE the basic RU is composed of either a single slot or a pair of slots.

In a practical system, the frequency slot index p represents the logical set of frequency slots allocated in a given frequency partition numbered sequentially as p=1, 2, . . . Nf. These slots may be either physically contiguous or physically non-contiguous (distributed), and are scattered over the entire frequency band.

For downlink, typical values for P and Q are: P=18, Q=6, P=18, Q=5, P=18, Q=7, P=12, Q=7, P=12, Q=14, and not limited to these values alone. In uplink typical values for P and Q are: P=6, Q=6, P=4, Q=6, P=18, Q=6, P=18, Q=2, P=18, Q=4, P=18, Q=10, P=4, Q=4, P=4, Q=8, P=4, Q=12, P=12, Q=7, P=12, Q=14, and not limited to these values alone.

A typical RB that is used in the DL and UL of IEEE 802.16m is shown in FIG. 4. The RB uses 18 subcarriers in frequency and 6-OFDM symbols in time. Pilots are scattered in the 18×6 frequency-time grid. The pilot location is indicated by "1". Data may be allocated in a single RB or over multiple RBs, which are either contiguous or distributed in frequency. In DL, the receiver processes each RB independently i.e., channel estimation is done after collecting the received pilot tones of a single RB or multiple RBs. A two dimensional minimum mean square (2D-MMSE) channel estimation algorithm can be used to track the channel variation both in frequency and time.

Figure 5:
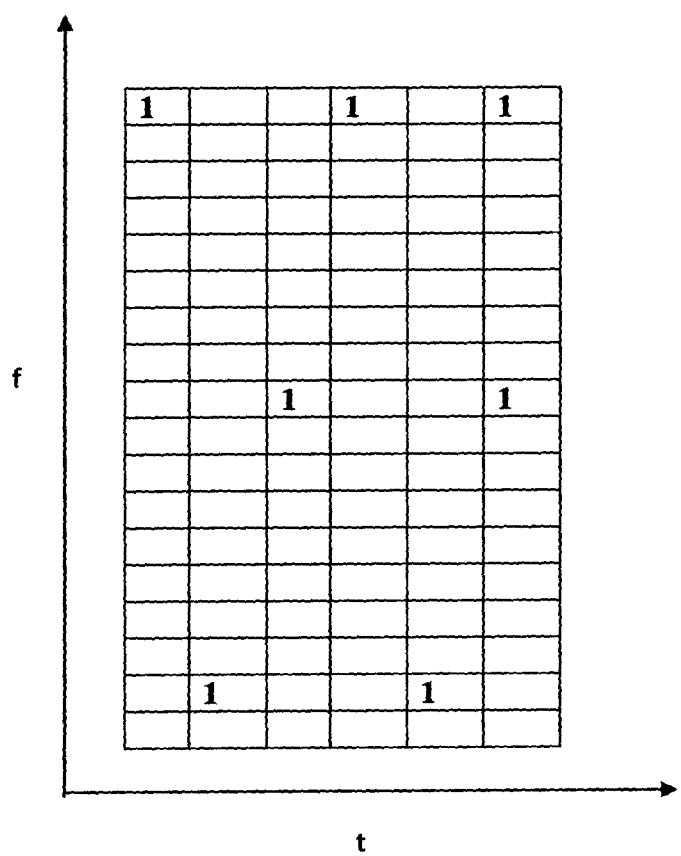
FIG. 5 shows an example of resource block for OFDMA DL.
Figure 6:
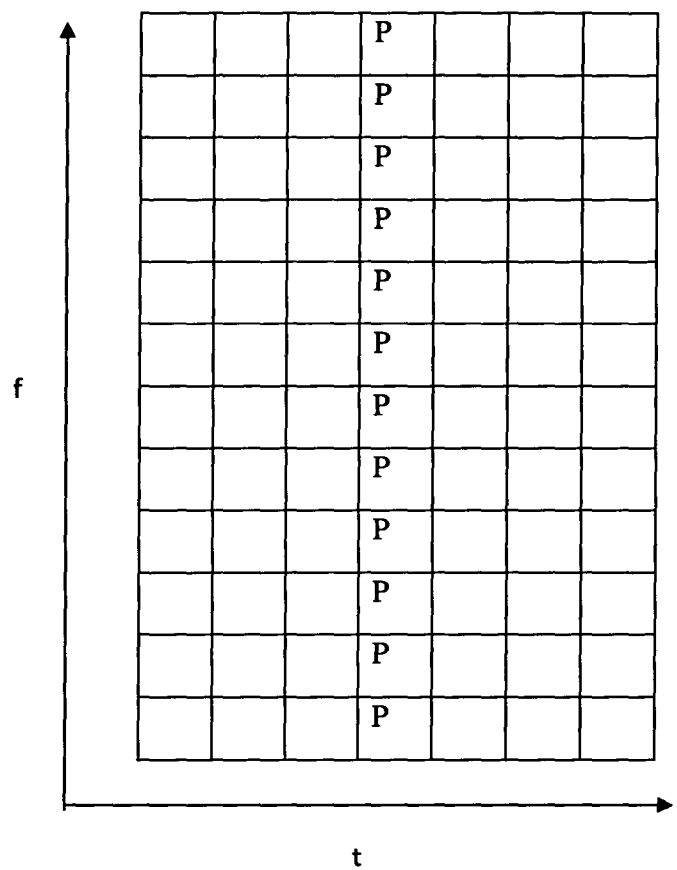
FIG. 6 shows an example PRU (slot) structure in 3GPP-LTE uplink.

A typical slot format for localized/distributed SC-FDMA, which is used in the uplink of 3GPP-LTE standard is shown in FIG. 5. The slot consists of 12 subcarriers in frequency and 7-OFDM symbols. Pilot tones are transmitted in the fourth OFDM symbol. The remaining 6 OFDM symbols are used for transmission of DFT-S-OFDMA data tones. Pilot symbol does not use DFT spreading. The pilot tones are directly modulated using constant-amplitude-zero-auto-correlation (CAZAC) sequences, which has a low peak-to-average-power-ratio (PAPR). Generally, in DFT-S-OFDMA, the number of tones allocated in every OFDM symbol of a slot is an integer multiple of 12. Therefore, in LTE, the uplink slot consists of P (integer multiple of 12) subcarriers in frequency and 7 OFDM symbols.

In LTE, data may be typically allocated in pairs of slots which are contiguous in time. Therefore, for channel estimation purposes, the receiver may use two pilot OFDM symbols which are separated in time. A 2D-MMSE channel estimation algorithm can be used to track the channel variation both in frequency and time.

In LTE down link, a slot is defined as 12 subcarriers in frequency and 7 OFDM symbols in time. LTE down link uses OFDMA with scattered pilots, which is a common pilot that spans the entire bandwidth, or a dedicated pilots within a slot (i.e., the pilot tones are scattered among the 12 subcarrier and 7 OFDM symbols), or a mix of common and dedicated pilots. LTE down link may also use data allocation in pairs of contiguous or distributed slots.

PREFERRED EMBODIMENTS

Conjugate Data Repetition (CDR)

Figure 7:
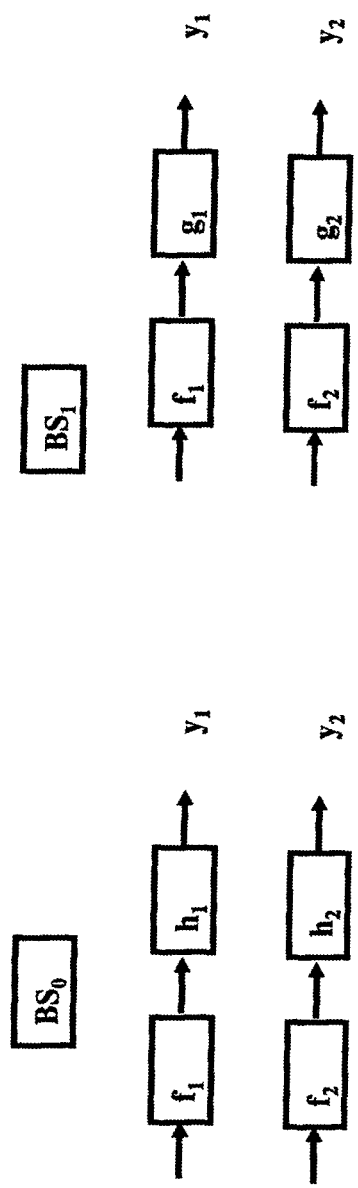
FIG. 7 illustrates CDR encoding in multiple BSs according to an embodiment herein.

Referring to FIG. 7, an embodiment as disclosed herein is for a repetition factor of two, and in a scenario when $h_1$=$h_2$=h and $g_1$=$g_2$=g, where $h_1$, $h_2$ and $g_1$, $g_2$ are the respective complex valued channel gains of the own and interfering base stations, at frequencies $f_1$ and $f_2$, respectively and h and g are the respective complex-valued channel gains from the own and interfering base stations (FIG. 7). This situation may arise either in a line-of-sight or frequency flat fading channel. The repeated data symbol must be complex-conjugated and then transmitted.

Referring to FIG. 7, when the desired signal is transmitted in conjugate symbol pairs as [$x_1 x^*_1$] (where * denotes complex conjugate operation) on any two subcarriers, the same operation is performed on those subcarriers at a different BS (or sector) while transmitting a co-channel signal [$\hat{x}_1 \hat{x}^*_1$]. The set of subcarriers on which data is repeated may be contiguous/distributed in a given OFDM symbols. Alternatively, the data may be repeated on same or different subcarriers in different OFDM symbols as well. Assuming flat channel fading (i.e., channel gains are approximately same on both subcarriers), the received signal from the two subcarriers can be, written as:

$$y_1 = hx + g\hat{x}_1 + n_1$$

$$y_2 = hx^* + g\hat{x}^*_1 + n_2,$$

where $y_1$ and $y_2$ are the signals collected from the first and second sub-carrier respectively, $n_1$ and $n_2$ represents the additive white Gaussain noise (AWGN) with zero mean and a constant variance. Taking the conjugate of the second sample results in $$y^*_2 = h^*x + g^*\hat{x}_1 + n^*_2.$$

Due to complex conjugation at the receiver, the channel states (h, h*) are distinct (they have same magnitude with different phases). Same applies to (g, g*). By filtering y1 and y2* jointly using an MMSE receiver, a single interferer can be suppressed completely because the signal and the interference go through different channels, and the channel states h and g are statistically independent. For the case with a repetition factor of two, conjugated data repetition ensures good interference suppression irrespective of the channel gain.

The above result can also be generalized to multi-antenna systems, and, it can be shown that conjugated symbol repetition based receiver can completely reject $2*N_r-1$ interferers, irrespective of the channel type. For example with $N_r=2$ receive antennas, this technique can fully reject 3-interferers.

For the purpose of illustration, a line-of-sight or frequency flat fading channel and a symbol repetition factor of 4 is assumed.

The basic idea is to introduce phase variations such that different subcarriers will undergo different channels. Since this conjugation already ensures full interference suppression when the repetition factor is two, a combination of conjugate repetition and random/deterministic phase variation of the repeated symbols is used, when the repetition factor is greater than 2. For example, the repetition pattern for desired signal with q=4 is given by: $\lfloor x \; x^* e^{j\theta(1)} \; xe^{j\theta(2)} \; x^* e^{j\theta(3)} \rfloor$. Here data is repeated on any four distinct subcarriers and a co-channel BS transmits $\lfloor \hat{x}_1 \; \hat{x}_1^* e^{j\theta_1(1)} \; \hat{x}_1 e^{j\theta_1(2)} \; \hat{x}_1^* e^{j\theta_1(3)} \rfloor$ on the same set of subcarriers. The phase values in the exponentials may be chosen deterministically (e.g., by maximizing the Signal to Interference Noise Ratio (SINR) at the output of an MMSE filter) or randomly (pseudo-random patterns may be used).

An alternative example implementation can be the following simplified pattern. The desired signal transmits $\lfloor x \; x^* \; xe^{j\theta(1)} \; x^* e^{-j\theta(1)} \rfloor$ on any four distinct subcarriers and a co-channel BS transmits $\lfloor \hat{x}_1 \; \hat{x}_1^* \; \hat{x}_1 e^{j\theta_1(1)} \; \hat{x}_1^* e^{-j\theta_1(1)} \rfloor$ on the same subcarriers. This pattern may simplify the channel and interference parameter estimation, since the phase offset is omitted from the first conjugated symbol. In practice, these phase offset values can be chosen to be pseudo random sequences which can be made either sector or BS ID dependent.

Similarly for q=6, the following format can be used: $\lfloor x \; x^* \; xe^{j\theta(1)} \; x^* e^{-j\theta(1)} \; xe^{j\theta(2)} \; x^* e^{-j\theta(2)} \rfloor$ and the same format will be used in a co-channel cell with a different values for $\theta(1)$ and $\theta(2)$. When q=3 or q=5, the pattern can be a subset of the pattern for the q=4 and q=6 cases, respectively.

After collecting the received signal from multiple subcarriers and performing the conjugation operation in those subcarriers on which conjugated data is sent, the received signal samples can be collected in a column vector format as:

$$y = hx + \underbrace{\sum_{m=1}^{M} g_m \hat{x}_m + n}_{i}$$

where M is the total number of co-channel interferers. In case of a flat fading or a LOS channel, the various channel vectors can be represented for the simplified repetition pattern as:

$$h = \begin{bmatrix} h \\ h^* \\ he^{j\theta(1)} \\ h^* e^{-j\theta(1)} \end{bmatrix},$$

$$g_m = \begin{bmatrix} g_m \\ g_m^* \\ g_m e^{j\theta_m(1)} \\ g_m^* e^{-j\theta_m(1)} \end{bmatrix}$$

$$m = 1, 2, \ldots M$$

In a highly frequency selective channel, the channel vectors can be represented as:

$$h = \begin{bmatrix} h_1 \\ h_2^* \\ h_3 e^{j\theta(1)} \\ h_4^* e^{-j\theta(1)} \end{bmatrix},$$

$$g_m = \begin{bmatrix} g_{m,1} \\ g_{m,2}^* \\ g_{m,3} e^{j\theta_m(1)} \\ g_{m,4}^* e^{-j\theta_m(1)} \end{bmatrix}$$

$$m = 1, 2, \ldots M$$

In this case the conjugated data pairs can be mapped to adjacent subcarriers whereas the phase repeated data can be mapped to subcarriers which are far apart.

In the proposed receiver implementation, an MMSE filter denoted as w filters, the received signal vector y to obtain a scalar decision metric z=wy. Using standard MMSE optimization the optimum filter is given by:

$$w = R_{xy} R_{yy}^{-1}$$

Where $$R_{xy} = E[xy^*] = E[|x|^2]h^*, \; E[|x|^2] \cong 1$$

$$R_{yy} = E[yy^*] = [hh^* + R_{i+n}] \text{ where}$$

$$R_{i+n} = E[(i+n)(i+n)^*] = \sum_{m=1}^{M} g_m g_m^* + N_0 I$$

where E denotes the expectation operator. The optimum solution for the above is given by:

$$w = h^*[hh^* + R_{i+n}]^{-1}$$

Using matrix inversion lemma, the MMSE filter can be represented in an alternative form as:

$$w = [1 + h^* R_{i+n}^{-1} h]^{-1} h^* R_{i+n}^{-1}$$

The SINR at the output of the MMSE receiver is given by:

$$\gamma = h^* R_{i+n}^{-1} h$$

If the data repetition is viewed as a spreading operation, the embodiments as disclosed can be extended to a synchronous DS-CDMA spread spectrum system where the spreaded data and its complex conjugate can be transmitted in distinct time slots. In an embodiment, a first data signal which is denied as the data symbol sequence that is multiplied with the PN code sequence is transmitted on one Walsh code. A complex-conjugated copy of the first signal is multiplied with another Walsh code before transmission.

The embodiments as disclosed works, particularly well with low delay CDD, phase-offset-diversity (POD), closed loop beam-forming, STBC, or SFBC. In this case the STBC/SFBC encoding will be applied to pairs of data tones (x1,x2) and (x3*,x4*) the outputs will be transmitted over two antennas on two multiple different time/tones. Same operation will be applied on different base stations in a coordinated manner. In the same way, conjugate transmission (and random phase spreading) concept can be applied to any open loop or closed loop space-time coding transmitter with arbitrary number of antennas. At the receiver, MMSE detection will be used to suppress interference.

The embodiments as disclosed is applicable in both downlink and uplink and can be applied for transmission of either control alone, data alone or a mix of control and data.

In yet another implementation alternative, the conjugate repeated data may be assigned in time-frequency dimensions as described below:
1) The conjugated and phase shifted data may be assigned in different OFDM symbols on same or different subcarriers. This type of mapping will aid the receiver in improving phase and frequency offset estimates.

CDR for OFDMA

Figure 8:
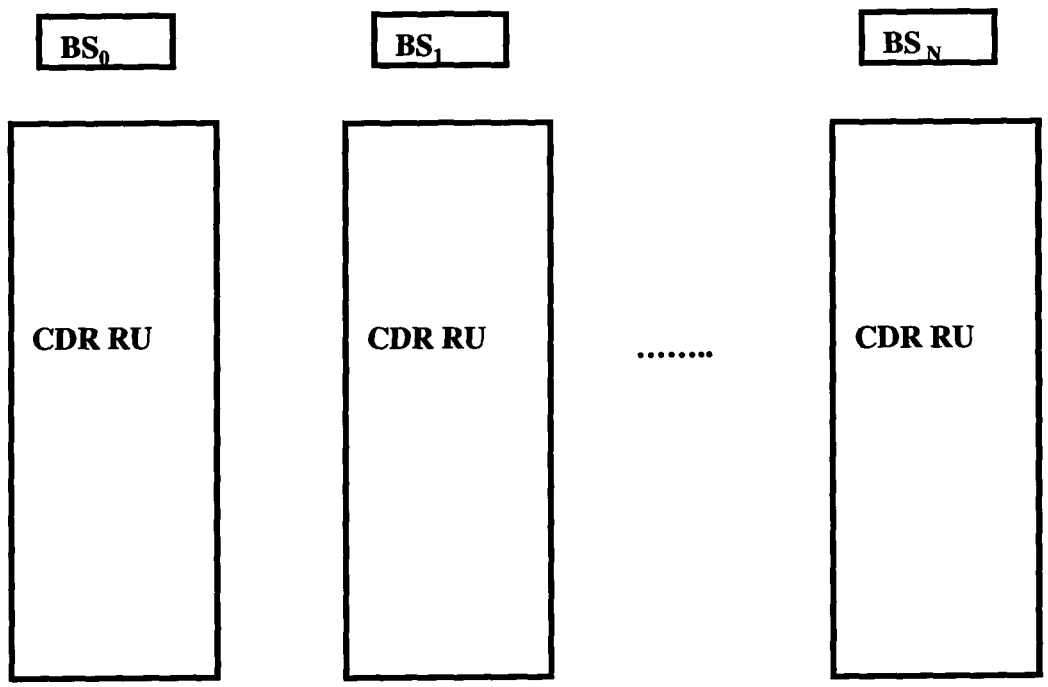
FIG. 8 illustrates CDR regions under multiple base stations according to an embodiment herein.

CDR feature can be implemented in OFDMA networks in a CDR region which is allocated to serve cell edge users and/or control channel transmission. The network assigns a pre-defined CDR region which is used for CDR encoding either in DL or UL. CDR region may be composed of a predefined set of resource units (e.g., a predefined set of either PRUs, or slots, or tiles be reserved for CDR) in each BS in the network. FIG. 8 illustrates the CDR region. Information about CDR region may be communicated to each MS in a broadcast control channel.

In CDR region, the data and its complex conjugate are mapped to a pair of subcarriers within a basic CDR resource unit. The basic CDR resource unit may be composed one or several PRUs/RBs/tiles which may be contiguous or distributed in time-frequency plane. Mapping of complex and complex conjugate copies of data on to any two subcarriers is denoted as CDR encoding operation. Same type of CDR encoding is applied synchronously in all BSs in the CDR region. In other words, when the desired signal is transmitted in symbol pairs as [D, D*] on any two subcarriers, the same CDR encoding operation is performed on the same pair of subcarriers in all BSs (or sectors) while transmitting their own data. CDR feature can be implemented either in DL or UL or both in DL and UL independently. When CDR is implemented in UL, all users in the network allocated in the CDR region use the same CDR encoding operation.

Figure 9:
FIG. 9 illustrates CDR encoding over single PRU or a pair of PRUs with real-valued pilots according to an embodiment herein.
Figure 10:
FIG. 10 illustrates CDR encoding over a pair of PRUs with conjugated pilots according to an embodiment herein.

If the basic CDR resource unit is one PRU (as in FIG. 9), the complex and complex conjugate data pair denoted as [D, D*] is mapped to any two subcarriers within that PRU. Certain subcarriers are reserved for pilot tones. The pilot tones preferably use real-valued modulation such as binary phase shift keying (BPSK). BPSK pilots aid in interference covariance estimation. If pilots use complex modulation, the pilots are also transmitted in conjugate pairs to facilitate interference covariance estimation at the receiver (as in FIG. 10).

If the basic CDR resource unit is a PRU pair (as in FIG. 10), a set of data subcarriers are transmitted in the first PRU and the complex-conjugate copies of the data contained the first PRU are transmitted in the second PRU. The first and second PRUs may be contiguous PRUs in time, or frequency. The first and second PRUs may also be distributed anywhere in the time-frequency grid. In certain cases, it is preferable to transmit pilot tones in conjugate pairs. A first set of pilot tones are transmitted in the first PRU, and its complex-conjugated copy is transmitted in the second PRU.

CDR in 16 m DL

In DL of IEEE 802.16m that uses OFDMA, the basic CDR resource unit may be chosen to be a single PRU which is composed of 18 subcarrier and 6 OFDM symbols, or 18 subcarrier and 5 OFDM symbols, or 18 subcarrier and 7 OFDM symbols. In each PRU of the 16m CDR region, the complex modulation symbol and its complex-conjugated copy are transmitted on a pair of subcarriers. The pair of subcarriers may be adjacent in time or frequency. Certain subcarriers are reserved for pilot tones. The pilot tones preferably use real-valued modulation such as binary phase shift keying (BPSK). BPSK pilots aids interference covariance estimation. If pilots use complex modulation, the pilots are also transmitted in conjugate pairs to facilitate interference covariance estimation at the receiver.

CoFIP

Figure 11:
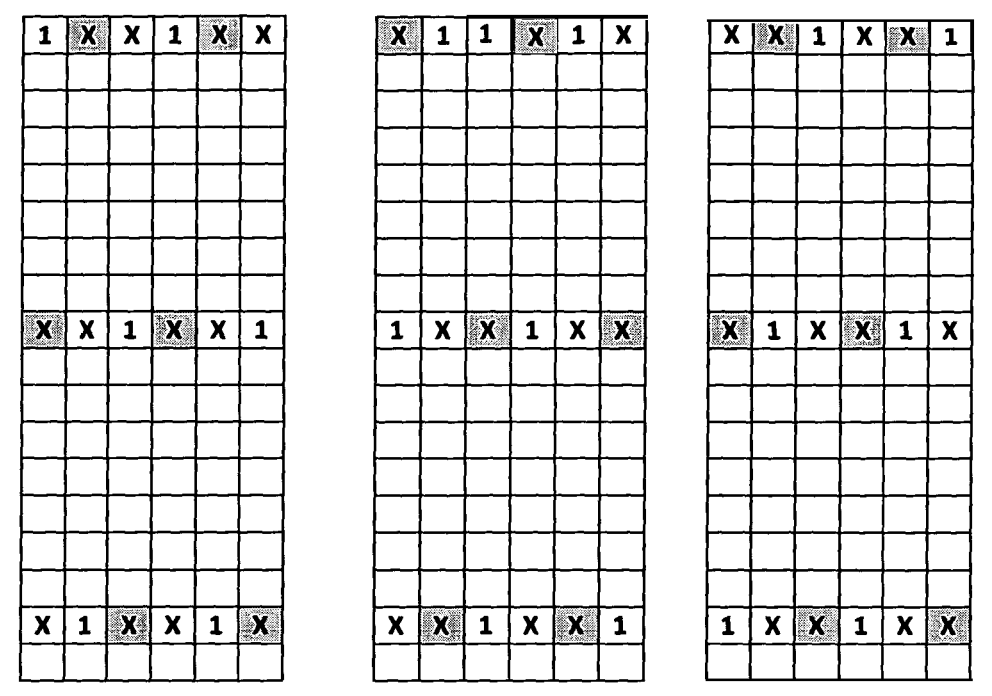
Figure 12:
FIG. 12 illustrates CDR Encoder with in a PRU with multi-antenna precoding according to an embodiment herein.

In CoFIP, null tones are introduced in the 1-stream interlaced pattern. In CDR region, each BS chooses one of the three CoFIP PRU types as shown in FIG. 11. The index of the CoFIP PRU type used by a particular BS or MS with Cell_ID=k is denoted by $p_k$. The index of the CoFIP PRU type is determined by the Cell_ID according to the following equation: $p_k = \text{mod}(k,3)$ where "mod" denotes the standard mathematical "modulo" operation. In the FIG. 11, X donates a null tone i.e., no data or pilot tone is transmitted in that location and '1' denotes a pilot tone which takes real-valued modulation such as BPSK. The data and pilots may be transmitted on multiple transmit antennas using antennas after multiplication with antenna specific weights as shown in FIG. 12. The above mentioned CoFIP allocation may be used in both DL and UL. In UL, the BS allocates the CoFIP PRU to each MS in the CDR region according to the serving Cell_ID. Referring to FIG. 11, null tones which are depicted with grey background denote the first set of null tones and null tones which are depicted without grey background denote second set of null tones. In CoFIP mode, null tones are transmitted in pilot locations of the PRUs of other sectors which have a different Cell_ID. Therefore, pilot tones of sectors with same cell ID cause co-channel interference.

CDR with CoFIP

In an embodiment, CDR region uses collision free interlaced pilot (CoFIP) PRU structure. An example of CDR subcarrier mapping is shown in FIG. 14. In each PRU, data and its complex conjugate are mapped together in adjacent OFDM symbols in time. Data is mapped on to even OFDM symbols and its conjugate copy is mapped to odd OFDM symbols as shown in FIG. 14. Mapping avoids pilot and null tones. An example of CDR data allocation in CoFIP Type 0 for single PRU allocation is shown in FIG. 14.

When the FEC coded block spans multiple PRUs, data may be allocated in frequency first, time second fashion i.e, data is allocated in all the tones reserved for data in the first OFDM symbol of all allocated PRUs. Then mapping continues to the next OFDM symbol. In the next OFDM symbol, a conjugate copy of the data contained in the previous OFDM symbols is mapped. Mapping thus continues in conjugate pairs until all allocated PRUs are completed filled.

In FIG. 15, the data and its conjugate are mapped in adjacent subcarriers. Mapping starts with the first OFDM symbol of the PRU and continues until the end of the OFDM symbol is reached. Mapping continues with the adjacent subcarrier in the next OFDM symbol and proceeds until the end of the PRU is reached. CDR mapping skips pilot and null tones.

When the FEC coded block spans multiple PRUs, mapping is preferably done frequency first and time second manner i.e., CDR encoding starts with the first PRU in the allocated sub-frame. Note that a sub-frame is defined as contiguous set of R subcarriers and N OFDM symbols. After filling the first PRU completely, CDR mapping continues with the next PRU in frequency direction and continues until all PRUs are completely filled. Mapping skips pilot and null tones.

CDR with Pilot-on-Pilot

Figure 16:
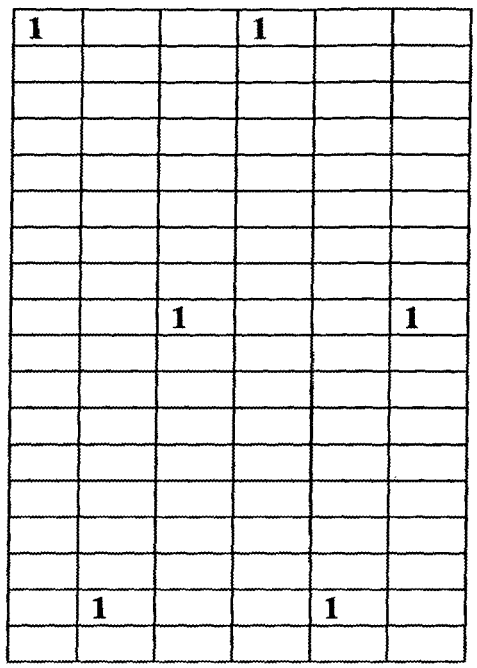
FIG. 16 shows a PRU structure with 6-pilots according to an embodiment herein.
Figure 17A:
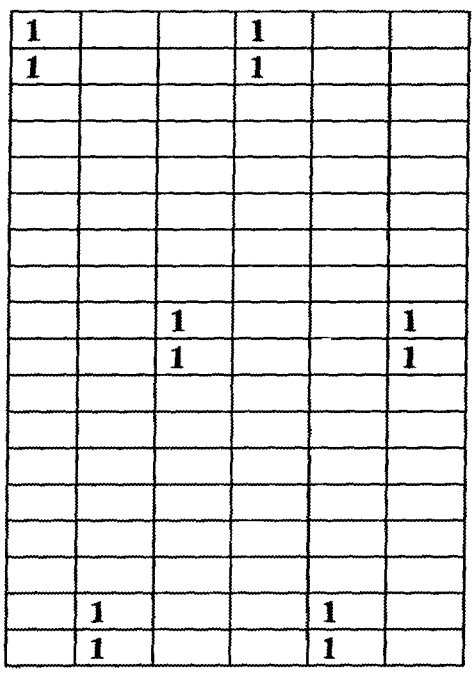
FIG. 17A shows a PRU structure with 12-pilots according to an embodiment herein.
Figure 17B:
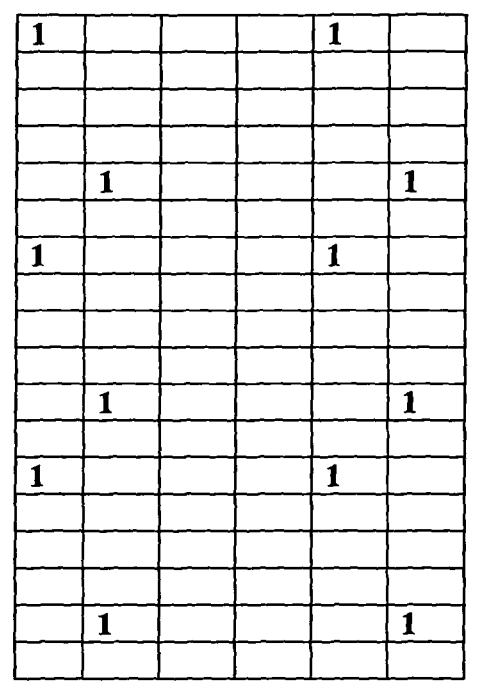

In pilot-on-pilot mode, each BS (or sector) chooses the same PRU type and the same pilot structure in all cells. Therefore, pilot tones of the desired signal are interfered by the pilot tones of interfering signals. It is preferable to use pilot sequences with low-cross correlation for signal and interfering pilot tones in different sectors. This pilot structure may be used in both DL and UL. In pilot-on-pilot mode, CDR encoding is preferably performed over a pair of adjacent subcarriers in the PRU. Mapping excludes pilot tones. In FIGS. 15,16 and 17, PRU structures are shown with different pilot patterns. Any one of the PRU structures may be used for CDR operation. In a PRU, CDR encoding can be performed by allocating (D, D*) to any pair of subcarriers locations except the pilot locations. All BSs or MS in the CDR region perform the same type of CDR encoding.

Figure 18:
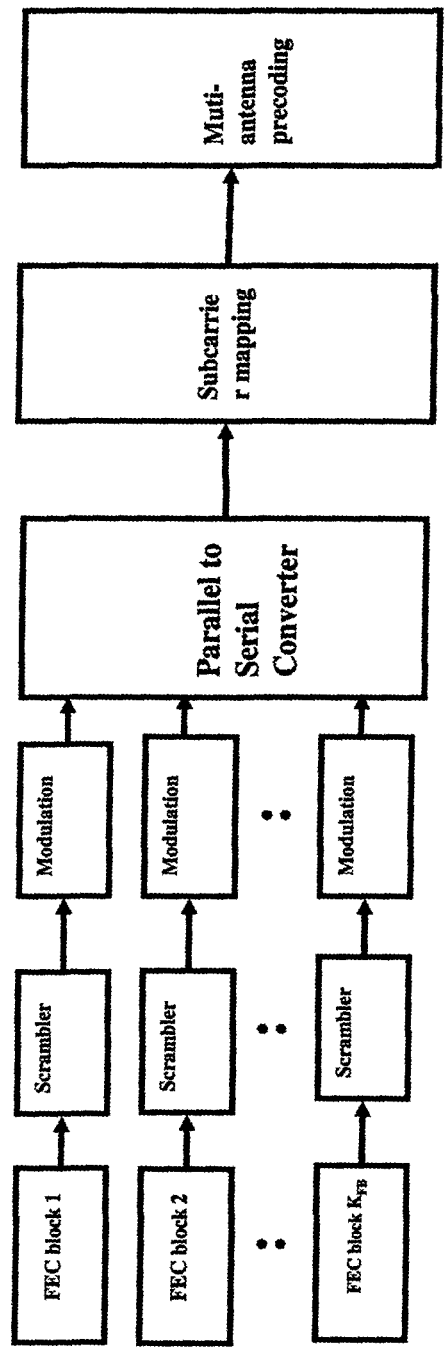
FIG. 18 illustrates CDR signal transmission according to an embodiment herein.

Transmission Chain:

According to an embodiment, the FEC encoding and CDR encoding, and antenna precoding steps are illustrated in FIG. 18. The output bits from each FEC block are passed through a scrambler. The scrambler uses a cell specific scrambling sequence. The scrambled bits are mapped to M-ary modulation symbols. The system may use QPSK, 8-PSK, 16-QAM, 64-QAM modulation formats. The outputs of the modulators are multiplexed into a single stream of modulation symbols and are then mapped to the allocated resources using CDR encoding. Multi-antenna transmit encoding is performed after CDR encoding subcarrier mapping.

Multi-Antenna Precoding with CDR

In an embodiment, CDR encoded signal is transmitted over multiple antennas using a multi-antenna precoder as shown in FIG. 12. In a preferred implementation, the precoder kept fixed for all the data and pilot tones contained a PRU. The precoder applies a antenna specific complex weight to the CDR encoded signal and transmits the signals over multiple antennas simultaneously.

Figure 19:
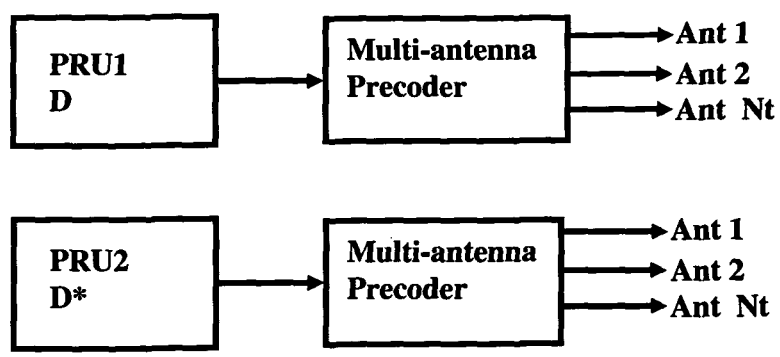
FIG. 19 illustrates CDR encoding over a pair of PRUs with multi-antenna precoding according to an embodiment herein.

FIG. 19, illustrates CDR encoding combined with multi-antenna precoding for two PRU case. The precoder for the first and second PRUs may be same or different.

Figure 20:
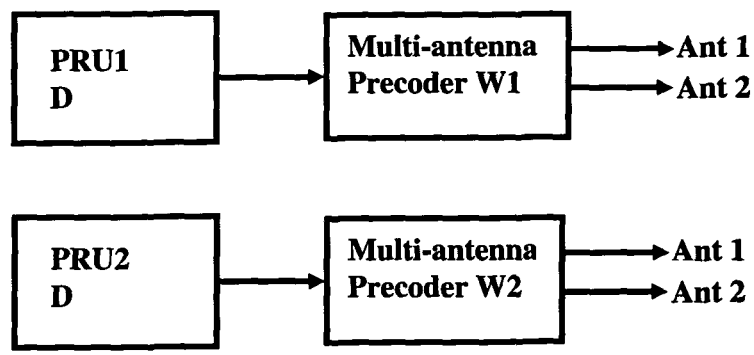
FIG. 20 illustrates joint coding of repetition coding and multi-antenna precoding for 2-Transmission antennas according to an embodiment herein.
Figure 21:
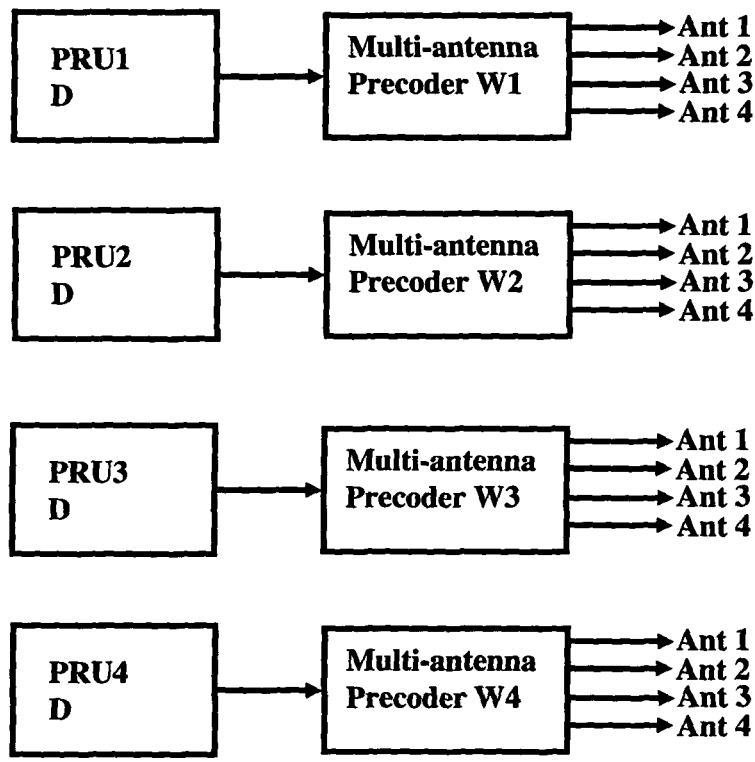
FIG. 21 illustrates joint coding of repetition coding and multi-antenna precoding for 4-Tx antennas according to an embodiment herein.

In another embodiment, repetition coding and multi-antenna precoding may be jointly implemented to facilitate efficient interference suppression. Referring to FIG. 20, the first PRU transmits data and pilot tones. A multi-antenna precoder denoted as W1 is applied to the first PRU. A second PRU is an identical copy of the first PRU and a different precoder W2 is applied on the second PRU. This operation can be repeated 'n' times where in each PRU uses a different precoder. The PRUs in which data is repeated may be contiguous in time, or contiguous in frequency, or the PRUs may be distributed anywhere in the time-frequency plane. FIG. 21, shows repetition coding scheme for 4-Tx antennas. Network may define a precoding interference suppression region in which all BSs apply this operation in a synchronous manner. This type of system can suppress $n*Nr-1$ interferers.

Figure 22:
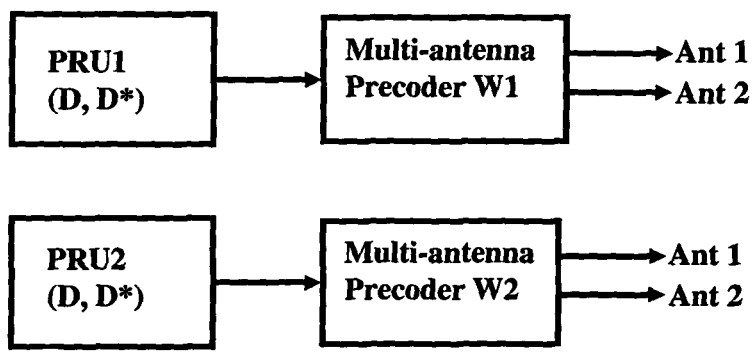
FIG. 22 illustrates repetition coding of CDR PRUs with multi-antenna precoding for repetition factor 4 according to an embodiment herein.
Figure 23:
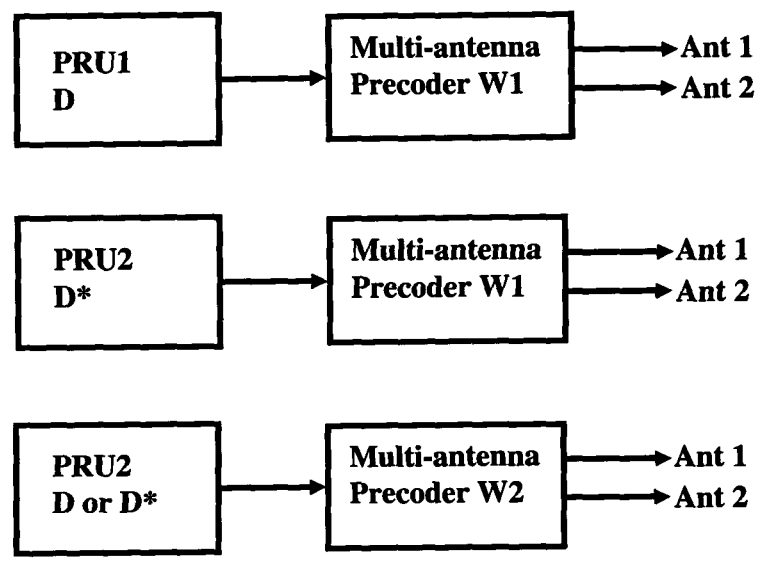
FIG. 23 illustrates repetition coding of CDR PRUs with multi-antenna precoding for repetition factor 3 according to an embodiment herein.

In another embodiment, CDR can be combined with simple repetition coding and antenna precoding for effective interference suppression. CDR encoding is applied with the first set of PRUs. FIG. 22 shows an implementation for repetition factor 4. CDR encoding may be done either in a single PRU or it may be applied block-wise over a pair of PRUs. A multi-antenna precoder denoted as W1 is applied to the first set of PRUs. The second set of PRUs are identical copies of the first set of PRU but uses a different precoder W2. This operation is repeated 'n' times. Network may define a precoding CDR region in which all BSs apply this operation in a synchronous manner. In this type of systems, receiver filters received signals corresponding to repeated data along with conjugated copies of the conjugated data using an MMSE type filter. This type of system can suppress $2*n*Nr-1$ interferers. FIG. 23 shows a combination of CDR encoding and repetition coding for repetition factor 3 for 2-Tx antennas case.

DFT-S-OFDMA with Conjugate Data Repetition

Figure 24:
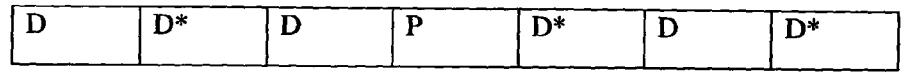
FIG. 24 illustrates SC-FDMA CDR in one PRU according to an embodiment herein.
Figure 25:
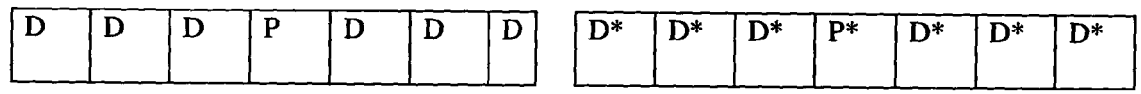
FIG. 25 illustrates SC-FDMA CDR in a pair of PRUs according to an embodiment herein.

In an embodiment, DFT precoded OFDMA data carriers are transmitted in conjugate pairs in different OFDM symbols. In this scheme, the conventional DFT precoded OFDMA data tones are transmitted in one OFDM symbol. In another OFDM symbol, the DFT pre-coded data subcarriers are complex-conjugated before transmission. In an implementation alternative, instead of conjugating the data in frequency domain, the time domain modulation sequence can be complex-conjugated and time reversed before taking DFT. To facilitate efficient channel estimation and interference suppression, the pilot tones are also transmitted in conjugate pairs in different OFDM symbols. Example PRU structures with conjugate repetition are shown in FIGS. 24 and 25.

DFT-S-OFDMA CDR within One PRU:

If DFT-S-OFDMA CDR is applied within one PRU, data is transmitted in conjugate pairs in different OFDM symbols. FIG. 24, shows CDR encoding for single PRU (or slot) case. The PRU consists of seven consecutive OFDM symbols. CDR encoding is performed block wise in pairs of OFDM symbols as shown in FIG. 24. If one symbol is reserved for pilots, it is preferable to use BPSK pilots. If two symbols are reserved for pilots, complex-valued pilots can be used in conjugate pairs.

DFT-S-OFDMA CDR Two PRUs:

FIG. 25, shows DFT-S-OFDMA CDR encoding applied within two PRUs. The first PRU consists of 7 OFDM symbols where the $4^{th}$ OFDM transmits pilot tones. The remaining 6 OFDM symbols carry DFT precoded OFDMA tones. The first three and last three, OFDM symbols in the second PRU transmits complex-conjugated copies of the DFT-S-OFDMA data contained in the corresponding symbols of the first PRU. The $4^{th}$ OFDM symbol in the second PRU transmits a complex conjugated copy of the frequency domain pilot tones which are transmitted in the $4^{th}$ OFDM symbol of the first PRU. The first and second PRUs may span contiguous time slots.

DFT-S-OFDMA with Pilot-on-Pilot

In pilot-on-pilot mode, each sector chooses the same pilot locations in all cells. Therefore, pilot tones of the desired signal are interfered by the pilot tones of interfering signals. It is preferable to use pilot sequences with low-cross correlation for signal and interfering pilot tones in different sectors. This pilot structure may be used in both DL and UL.

DFT-S-OFDMA with CoFIP

Figure 26:
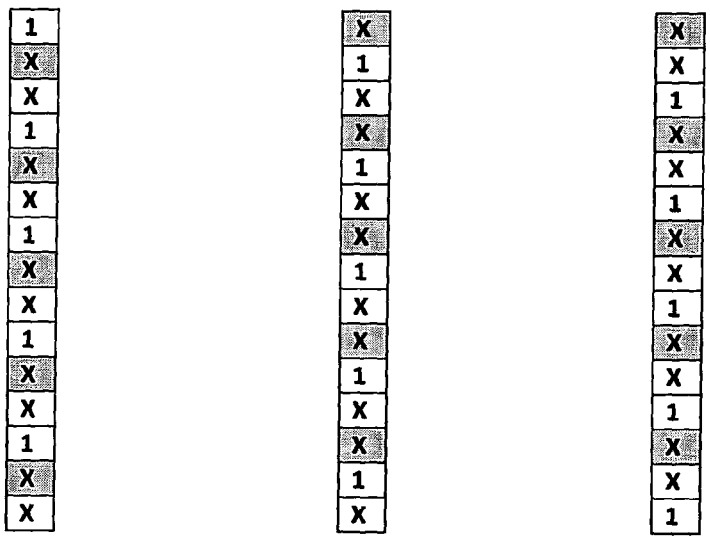
FIG. 26 illustrates Collision Free Interlaced Pilot Structure for SC-FDMA 1 pilot stream according to an embodiment herein.

In an embodiment, SC-FDMA CDR region uses collision free interlaced pilot (CoFIP) structure. In CoFIP, null tones are introduced in the 1-stream interlaced pattern as shown in FIG. 26. In CDR region, each BS or MS chooses one of the three CoFIP pilot types as shown in FIG. 26 when the number of used subcarriers allocated to DFT spreading is 12. The index of the CoFIP PRU type used by a particular BS or MS with Cell_ID=k is denoted by $p_k$. The index of the CoFIP pilot type is determined by the Cell_ID according to the following equation: $p_k$=mod(k,3) where mod denotes "modulo" operation. In the FIG. 26, X donates a null tone i.e., no data or pilot tone is transmitted in that location and '1' denotes a pilot tone. The pilot sequences may use complex valued pilots with low PAPR. CAZC sequences are one such example. The pilot sequences may use real-values sequences such as BPSK sequences. Referring to FIG. 26, in each sector, null tones with grey background denote first set of null tones and null tones without grey background denote second set of null tones. In FIG. 26, CoFIP structure is illustrated when number of allocated tones is 12. The structure can be extended any number of allocated tones which are multiple of 12, by repeating the given structure multiple times in frequency axis.

DFT-S-OFDMA with Multi-Antenna Precoding

Figure 27:
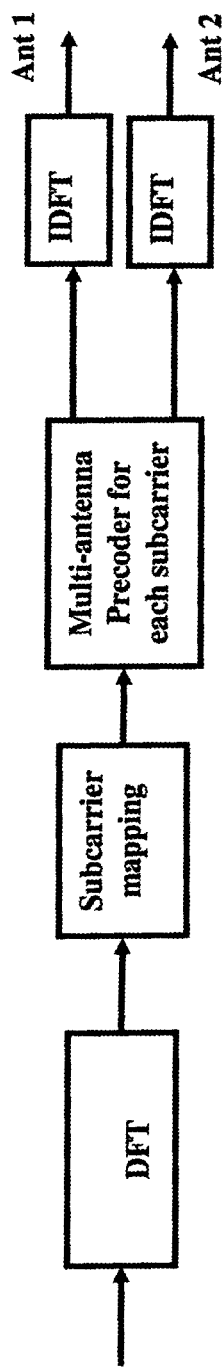
FIG. 27 illustrates DFT-S-OFDMA with precoding according to an embodiment herein.

FIG. 27 illustrates a general DFT-S-OFDMA structure with precoding. The multi-antenna precoder is applied for each subcarrier after DFT precoding. When CDR is applied in a single PRUs as shown in FIG. 24, the precoder may take different values in different PRUs. However, if CDR is applied in two PRUs as shown in FIG. 25, it is preferable to keep the precoder constant over two PRUs. The precoder values may change every two PRUs. Though illustrated for 2-antenna case, the precoder can be generalized for any number of antennas.

Figure 28:
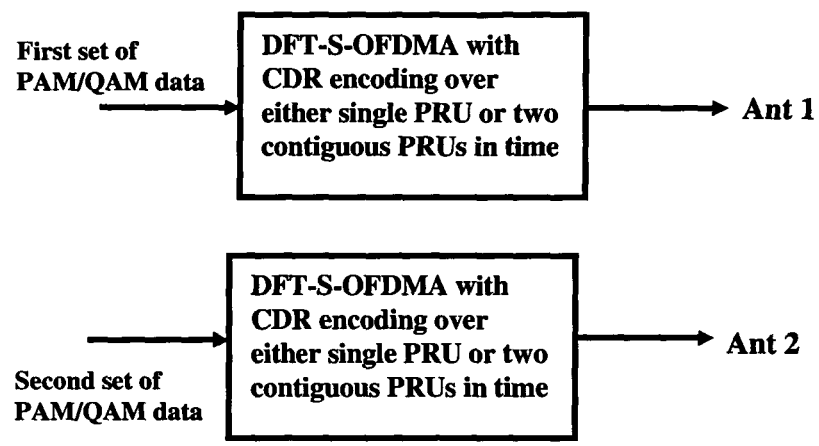
FIG. 28 illustrates CDR encoded DFT-S-OFDMA for 2-Transmission antennas according to an embodiment herein.
Figure 29:
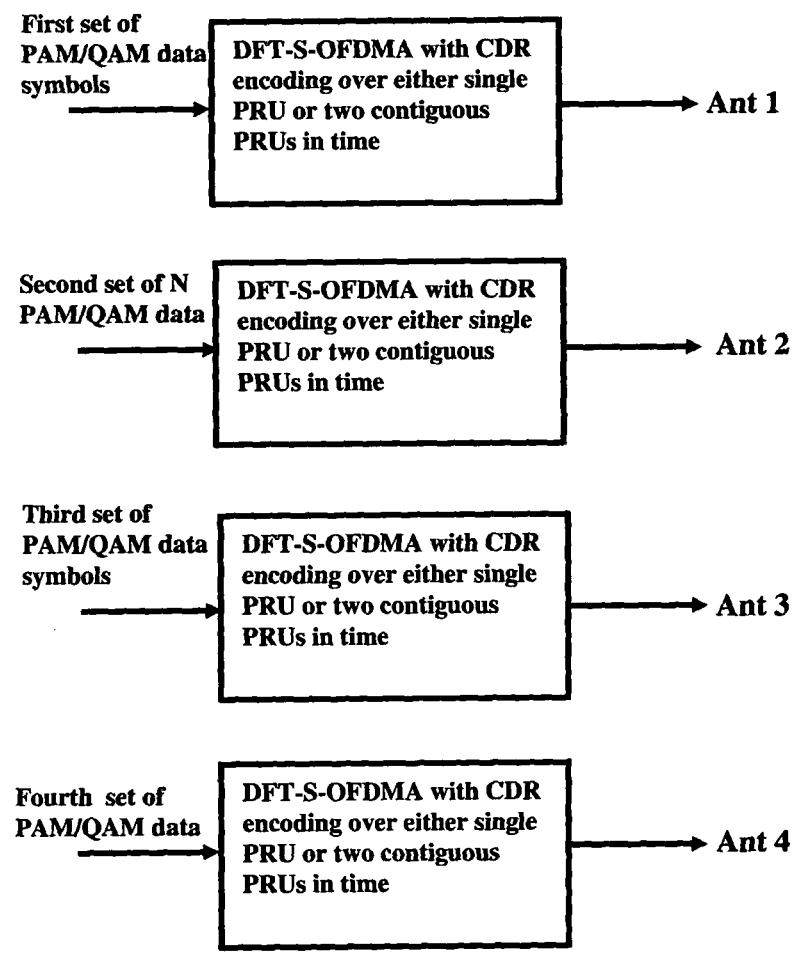
FIG. 29 illustrates CDR encoded DFT-S-OFDMA for 4-Transmission antennas according to an embodiment herein.

In an embodiment, the FEC encoded data is split into multiple sets where each set consists of contiguous set of PAM/QAM data. Each set is encoded using a DFT-S-OFDMA transmitter and the signal is transmitted using a set specific antenna. The DFT-S-OFDMA signal may use CDR encoding. When each set uses a distinct antenna, the number of sets is equal to the number of antennas. The sets may span contiguous frequency tones or the sets may be distributed in frequency. FIGS. 28 and 29 illustrates the transmitter structure for 2 and 4-antenna cases respectively.

Figure 30:
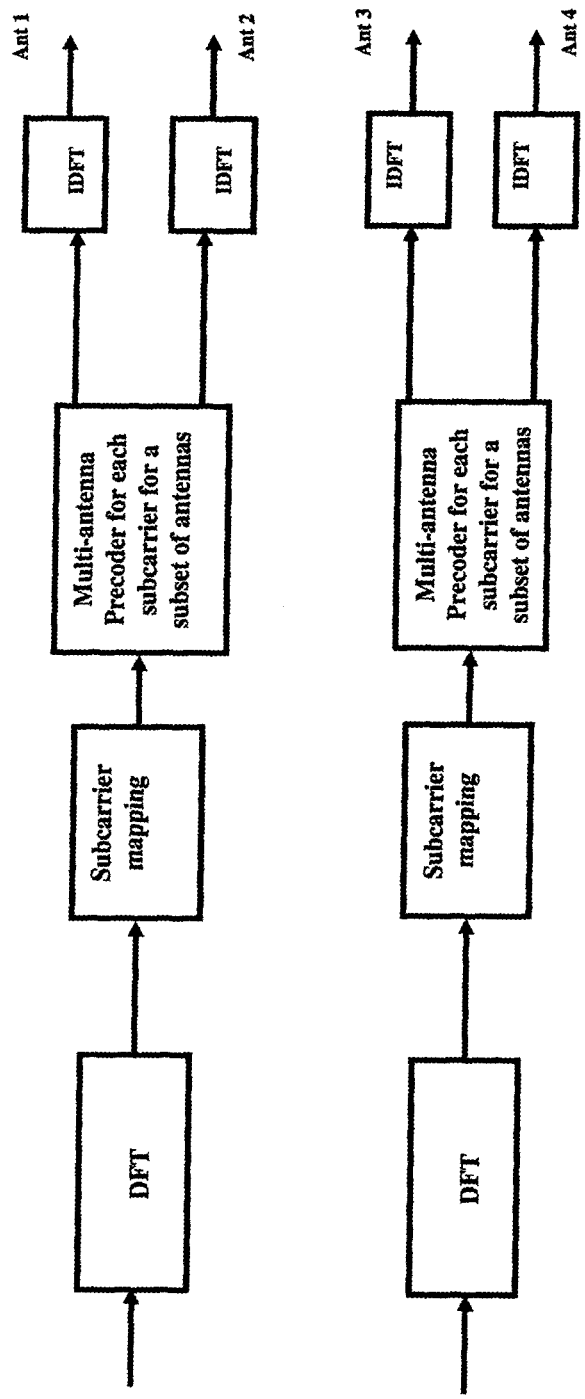
FIG. 30 illustrates DFT-S-OFDMA with multi-antenna precoding according to an embodiment herein.

In yet another embodiment, the FEC encoded data is split into multiple sets where each set consists of contiguous set of PAM/QAM data. Each set is encoded using a DFT-S-OFDMA transmitter and the signal is precoded and the precoded is transmitted using a subset of antennas. FIG. 30, illustrates the general structure for 4-antenna case. The DFT-S-OFDMA signal may use CDR encoding as shown in FIG. 24 or 25.

CDR Receiver for OFDMA

Figure 31:
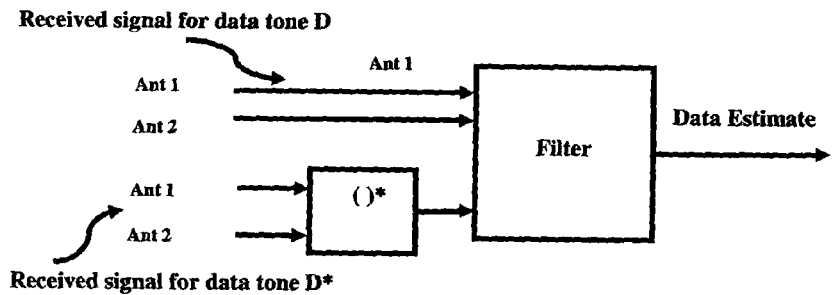
FIG. 31 illustrates an OFDMA CDR receiver according to an embodiment herein.

In CDR region, the receiver receives a CDR encoded desired signal and several CDR encoded interferers. After collecting the received signal from multiple subcarriers and performing the conjugation operation in those subcarriers on which conjugated data is sent, the signal received on each receiver antenna contains two copies of signal and interference data which undergo distinct channels. With Nr receiver antennas, the CDR encoded signal gives 2*Nr copies of the signal. A receiver processes the 2*Nr signal samples to reduce interference. In an embodiment, each of the 2*Nr received signal is filtered and combined to obtain a decision metric for demodulation. Filtering includes weighing of the received signal with a real/complex weight and summing up the weighted signals to obtain a decision metric for demodulation. The weights are obtained by minimizing the mean-square-error or by maximizing the post-processing SINR of the receiver. Computation of weights takes into account an estimate of the channel state information of the desired signal and covariance of the CDR encoded interference plus background noise. The filtered signal is used for demodulation of transmitted modulation data. FIG. 31 illustrates the receiver structure for 2-receiver antenna case. IN the figure the symbol ( )* denotes complex conjugation operation.

Figure 32:
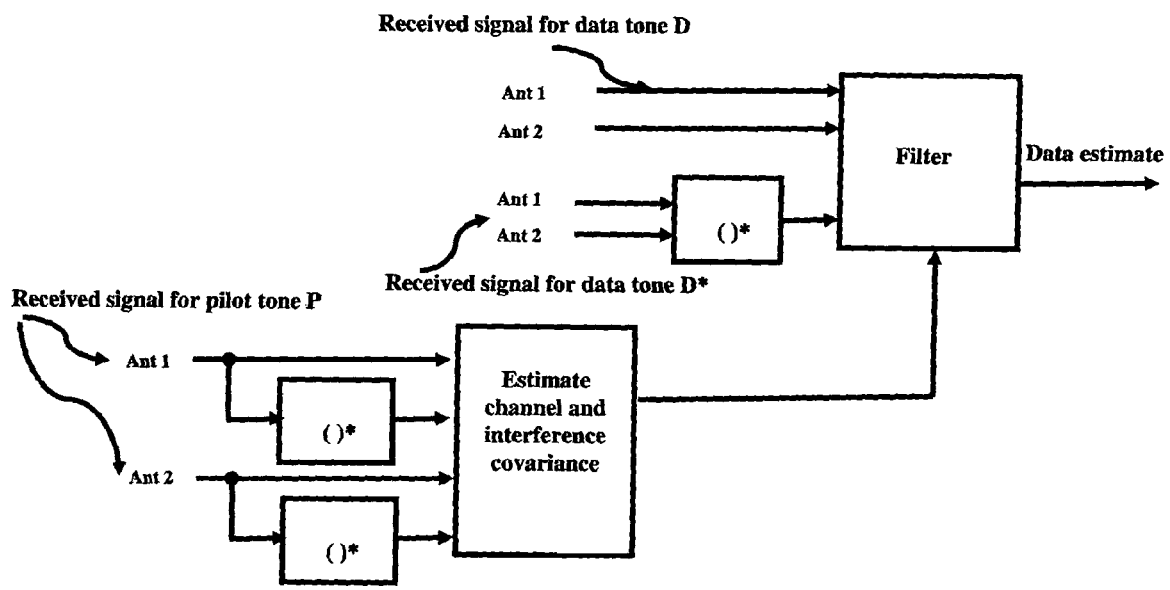
FIG. 32 illustrates an OFDMA CDR receiver for real-valued pilots according to an embodiment herein.
Figure 33:
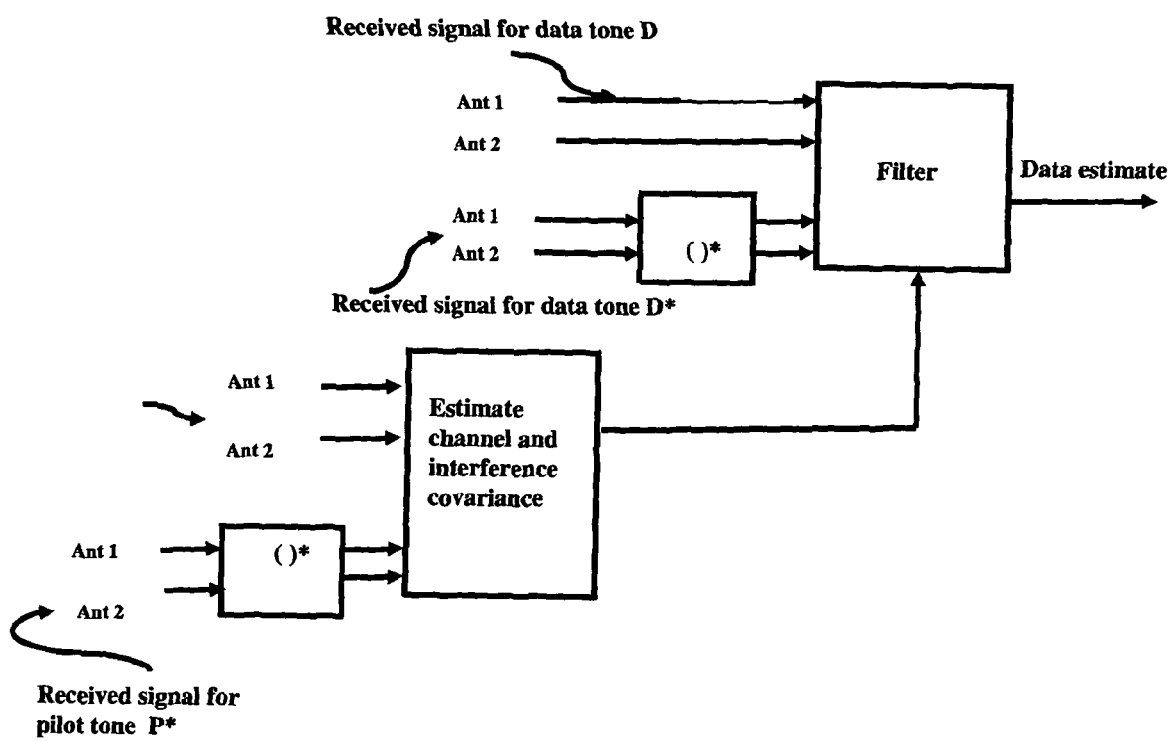
FIG. 33 illustrates an OFDMA CDR receiver for complex-valued pilots according to an embodiment herein.

FIG. 32, shows a CDR receiver structure when pilot tones are modulated by real-valued modulation such as BPSK. Since pilot tones use real-valued modulation, at each receiver antenna, collecting the complex valued received pilots, and the complex conjugate of the received pilot signal generates two distinct copies of signal and interference. Collecting the pilot samples from all receiver antennas provides 4 copies altogether. The pilot samples are used to estimate the channel state information and the covariance of the thermal noise plus total interference. This information is used to obtain the filter weights. FIG. 33, shows a CDR receiver structure when pilot tones are modulated by complex-valued modulation.

Pilot-Processing in Pilot-on-Pilot Mode:

If pilots use real-valued modulation such as BPSK, the receiver first performs 2D-MMSE channel estimation in conventional manner. Receiver uses the estimated channel states and knowledge of known pilots to construct the desired pilot signal. The reconstructed pilot signal is subtracted from the received pilot signal to obtain the interference samples. Since interference also uses real-valued pilots, the receiver collects the complex and complex conjugate copies of the interference samples and uses them for interference covariance estimation.

Figure 34:
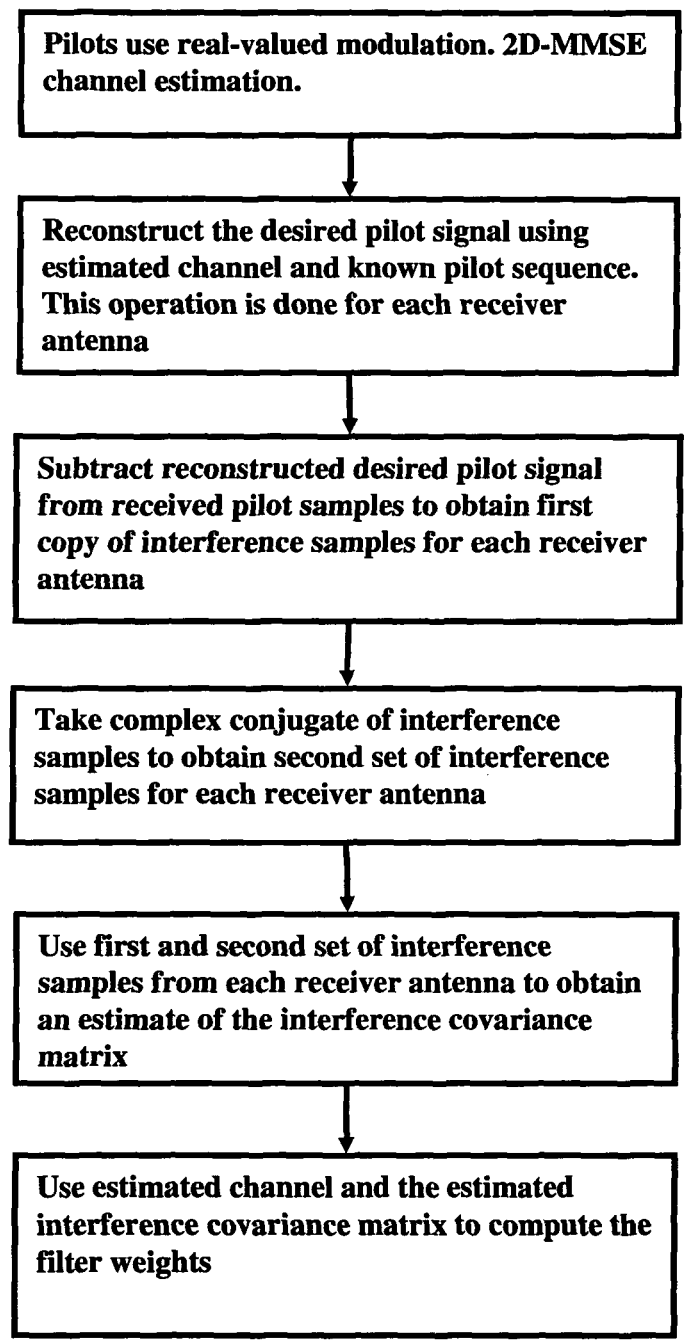
FIG. 34 is a flow chart showing receiver processing in pilot-on-pilot mode when pilots take real-values according to an embodiment herein.
Figure 35:
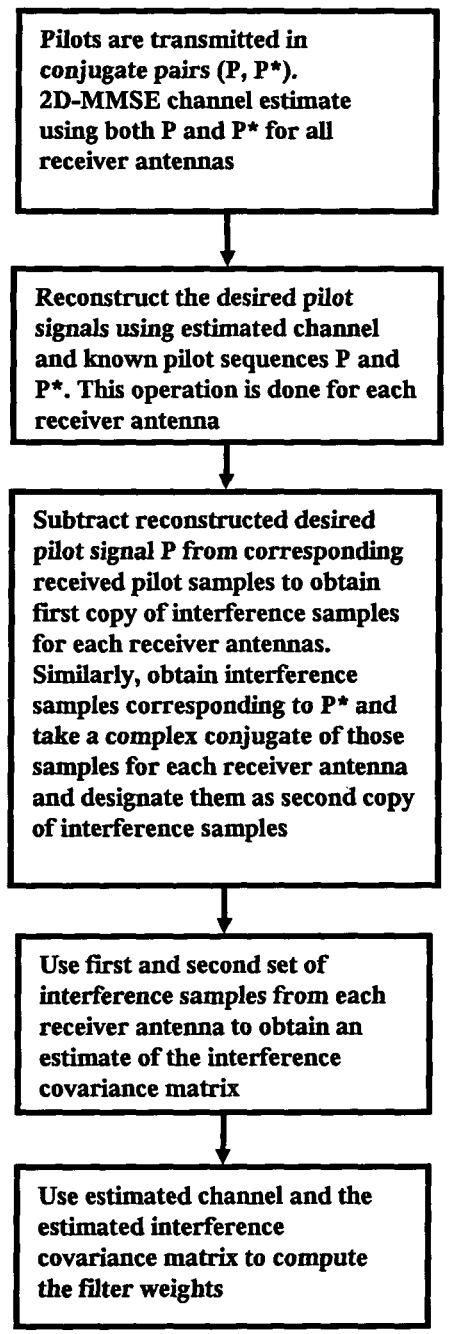
FIG. 35 is a flow chart showing receiver processing in pilot-on-pilot mode when pilots take complex values according to an embodiment herein.

If the system transmits pilots and its conjugate together, channel estimation can be done using conventional techniques using both pilot and its conjugate pair. Further, receiver collects the complex-conjugated copy of the received signal corresponding to the conjugated pilot tones and uses both observations for interference covariance estimation. Interference covariance is stable within the CDR resource unit. Typically, the interference covariance is estimated in each CDR resource unit independently. The receiver processing steps are outlines in the FIGS. 34 and 35 for real and complex-valued pilot cases respectively.

Pilot-Processing in CoFIP:

If pilots use real-valued modulation such as BPSK, the receiver first performs 2D-MMSE channel estimation in conventional manner. Referring to FIG. 13, in each sector, null tones with are depicted with grey background denote first set of null tones and null tones which are depicted without grey background denote second set of null tones. In CoFIP mode, interference covariance is estimated in several steps.

In the first step, receiver uses the estimated channel states and knowledge of known pilots to construct the desired pilot signal. The reconstructed pilot signal is subtracted from the received pilot signal to obtain the interference samples. Since interference also uses real-valued pilots, the receiver collects the complex and complex conjugate copies of the interference samples and uses them for covariance estimation of the CDR encoded interferers which are contained in the pilot samples. This covariance estimate is designated as first covariance estimate.

In the second step, collect the interference samples from the first set of null tones which contain interference from sectors with same cell ID. Collect the complex-conjugated copy of these interference samples. Use both observations to construct a second interference covariance estimate.

In the third step, collect the interference samples from the second set of null tones which contain interference from sectors with same cell ID. Collect the complex-conjugated copy of these interference samples. Use both observations to construct a third interference covariance estimate.

In a preferred embodiment, all the three covariance estimates are combined to estimate the total covariance. Receiver uses the estimated channel and the total covariance to obtain a set of weights for filtering. In some embodiments, covariance estimate from pilot signal may not be used to obtain the total covariance.

In CoFIP mode, if pilots are transmitted in conjugate pairs, covariance estimation step uses the complex and complex conjugate copies of the interference samples for estimation.

CDR Receiver for DFT-S-OFDMA

Figure 36:
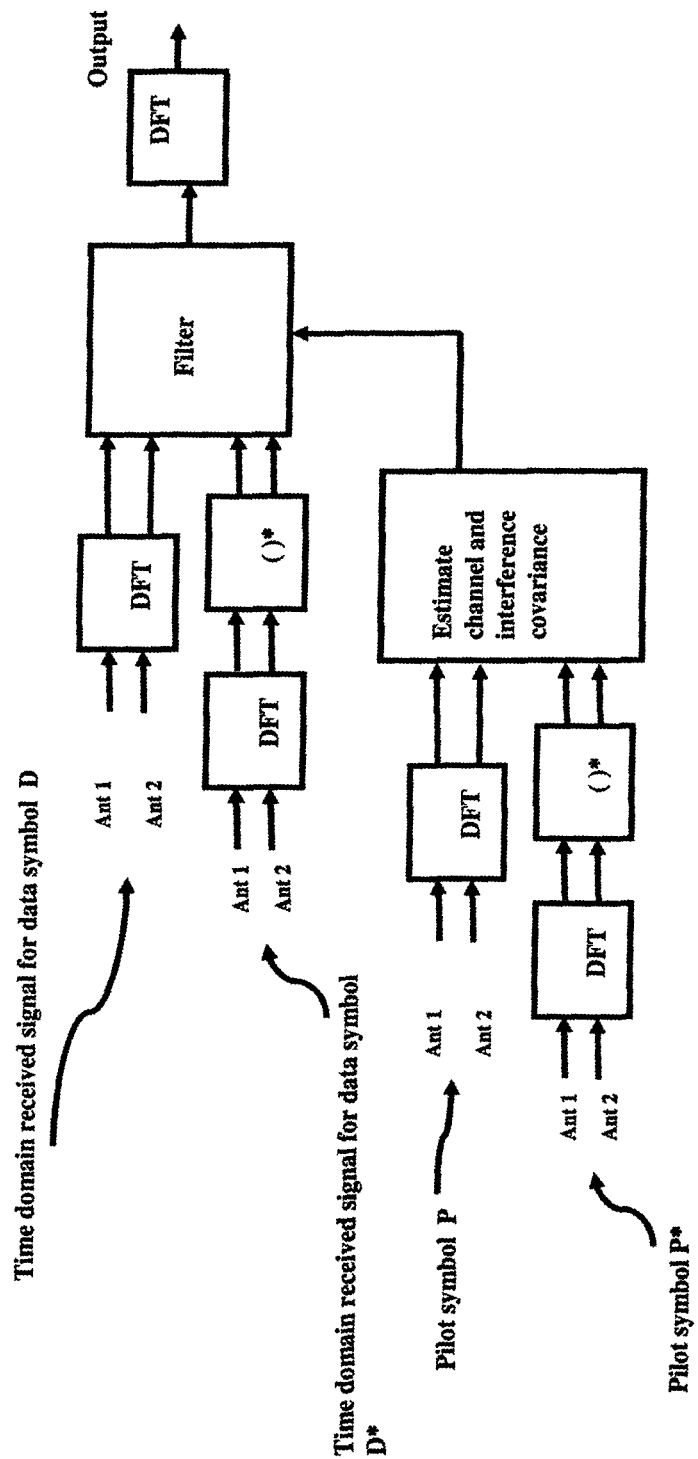
FIG. 36 illustrates a SC-FDMA CDR receiver for complex-valued pilots according to an embodiment herein.
Figure 37:
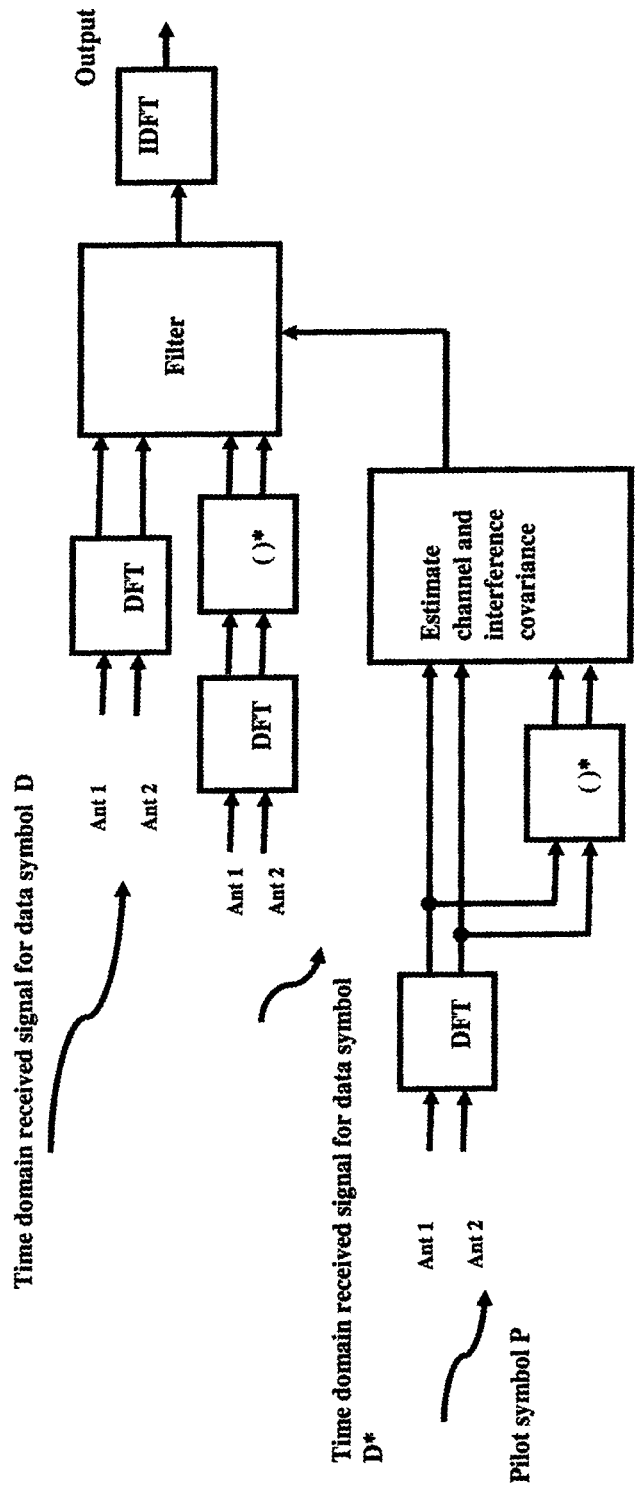
FIG. 37 illustrates a SC-FDMA CDR receiver for real-valued frequency domain pilots according to an embodiment herein.

Referring to FIG. 36, the SC-FDMA CDR processes receiver includes the following steps.

1) Down covert each DFT-S-OFDMA symbol to baseband and take DFT to obtain the frequency domain subcarriers
2) Use complex conjugation operation on those symbols in which data is conjugated. In an implementation alternative, instead of conjugating the data in frequency domain, the time domain sequence can be complex-conjugated and time reversed before taking DFT.
3) Jointly filter the complex and complex conjugate copies of the received frequency domain data samples including those samples obtained from multiple receiver antennas. Filtering includes weighing and summing of the complex and complex-conjugated subcarriers samples. Filter coefficients can be obtained by minimizing the mean-square-error or by maximizing the post-processing receiver SINR. After filtering, use IDFT to recover an estimate of the transmitted modulation data.
4) Filtering requires an estimate of channel response of the desired signal and also an estimate of the covariance of the CDR encoded interference plus background noise.
5) Channel estimation can be obtained using standard 2D-MMSE type techniques
6) Interference covariance can be estimated using techniques similar to the ones described in OFDM case employing either COFiP or pilot-on-pilot. The general steps involved in channel estimation and covariance estimation are described in FIGS. 34 and 35 for real and complex valued pilot cases, respectively.

Preferred Embodiments for SC-FDMA Channel Estimation and Covariance Estimation with CoFIP Referring to FIG. 25, which shows SC-FDMA CDR structure, the receiver collects the received pilot tones from the first and second PRUs and processes them to estimate the channel response as well as the interference covariance. The CDR receiver processing steps are illustrated in FIG. 36. If the pilots use SC-FDMA CoFIP structure, the channel is estimated using conventional 2D-MMSE using the received samples corresponding to P and P*. Referring to FIG. 26, in each sector, null tones with grey background denote first set of null tones and null tones without grey background denote second set of null tones. The interference covariance is estimated in several steps.

In the first step, receiver uses the estimated channel states and knowledge of known pilots to construct the desired pilot signal. The reconstructed pilot signal is subtracted from the received pilot signal to obtain the interference samples. Since interference also transmits pilots in conjugate pairs, the receiver collects the complex-valued estimated interference samples from the first pilot symbol of the first PRU and also collects the complex-conjugate copy of the estimated interference samples from second pilot symbol of the second PRU. These samples are used for estimating the covariance of the CDR encoded interferers which are contained in the pilot samples. This covariance estimate is designated as first covariance estimate.

In the second step, collect the interference samples from the first set of null tones of the first pilot symbol which contain interference from sectors with same cell ID. Also, collect the complex-conjugated interference samples from the first set of null tones of the second pilot symbol which contain interference from sectors with same cell ID. Use both observations to construct a second interference covariance estimate.

In the second step, collect the interference samples from the second set of null tones of the first pilot symbol which contain interference from sectors with same cell ID. Also, collect the complex-conjugated interference samples from the second set of null tones of the second pilot symbol which contain interference from sectors with same cell ID. Use both observations to construct a third interference covariance estimate.

All the three covariance estimates are combined to construct the total covariance. Receiver uses the estimated channel and the total covariance to obtain a set of receiver weights.

Preferred Embodiments for SC-FDMA Channel Estimation and Covariance Estimation with Pilot-on-Pilot Referring to FIG. 25, which shows SC-FDMA CDR structure, the receiver collects the received pilot tones from the first and second PRUs and processes them to estimate the channel response for the entire signal. Receiver uses the estimated channel states using known pilots in the first PRU and second PRUs to construct a first and second desired pilot signals respectively. The reconstructed first pilot signal is subtracted from the received pilot signal from the first PRU to obtain a set of first interference samples. The reconstructed second pilot signal is subtracted from the received second pilot signal from the second PRU and these samples are complex-conjugated to obtain a set of second interference samples. The first and second interference samples are used to estimate covariance of the background noise plus interference.

CDR User Allocation in DL

The BS receiver long-term SINR feedback reports from each MS. The BS allocates classifies those users whose SINR falls below a predefined threshold as cell edge users. The scheduler in each BS allocates some of the cell edge users in a CDR region. Therefore, a cell edge MS receives a CDR encoded signal as well as CDR encoded interference from several neighboring BS. The structure in the signal is exploited by the receiver to suppress interference. The post-processing SINR of the CDR receiver may be feedback to the BS via a feedback channel. The post-processing SINR of feedback is typically reported every frame. The MS may report the SINR of best-L sub-bands where L is greater than or equal to 1. The BS allocates the appropriate modulation and coding scheme (MCS) to maximize the throughput for that user. CDR region may be fixed or it can be dynamically adjusted depending on the system load. The BSs may exchange the system load and information about the cell edge user distribution so that all BS can agree on the resources for CDR region.

In other embodiments, a central node (like a master controller) may be used for decision making purposes. The base stations may forward information received from users on long term and short term SINR for the central node to make a decision on the regions that require CDR encoded signal. The central node may make a decision and notify of such decision all base stations of one or more sectors. Further, the base stations will start transmitting CDR encoded signals to the regions identified by the central node.

CDR User Allocation in UL

In an embodiment both DL and UL allocate the same set of users in the CDR region. However, in UL, cell edge user classification can be done independently based on the feedback obtained from DL of each MS. The MS reports whether it should be classified as cell edge user or not. In UL, the BS may measure the post-processing SINR of best-L sub-bands and schedules the user in one or more best-L sub-bands.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A method of mitigating interference in a wireless telecommunications network, the method comprising:
   receiving a quality metric data from a plurality of mobile stations;
   identifying a set of mobile stations using said received quality metric;
   repeating incoming modulation symbols over one or more subcarriers for said identified set of mobile stations;
   encoding said repeated modulation symbols using at least one of complex conjugation and phase variation, wherein said encoding of said repeated modulation symbols is synchronized in a plurality of spatially separated transmitters; and
   transmitting said incoming modulation symbols and said encoded modulation symbols in said plurality of spatially separated transmitters in a synchronized transmission.

2. The method as in claim 1, wherein identifying said set of mobile stations that require interference mitigation comprises:
   using a long-term Signal to Interference Noise Ratio (SINR) feedback to identify if a mobile station requires interference mitigation; and
   using a short-term SINR feedback to decide if a change in modulation and coding scheme (MCS) is required for each said mobile station.

3. The method as in claim 1, wherein said quality metric is post processing SINR of best L sub-frequency bands.

4. The method as in claim 1, wherein each said identified mobile station from said set of mobile stations that require interference mitigation is allocated with at least one resource block within a region.

5. The method as in claim 1, wherein a mobile station requiring interference mitigation is identified when said quality metric is below a pre-determined threshold level.

6. The method as in claim 4, wherein said region requiring interference mitigation is identified based on a channel quality feedback from each said mobile station.

7. The method as in claim 1, wherein said transmitters are one of base stations or mobile stations.

8. The method as in claim 2, wherein said modulation and channel coding scheme is changed for interference mitigation in at least one of an uplink transmission and downlink transmission.

9. The method as in claim 4, wherein each said mobile station belonging to said region is identified for changing modulation and channel coding scheme.

10. The method as in claim 4, wherein said set of mobile stations belonging to said region are identified, wherein said region is common to a group of said transmitters in said network.

11. The method as in claim 4, wherein said region is identified based on at least one of:
    said region being part of a pre-defined frequency partition,
    said region being part of a pre-defined subframe, and
    said region being part of a pre-defined time-frequency region.

12. The method as in claim 4, wherein a size of said region is decided based on a channel quality feedback received at said plurality of transmitters from said plurality of mobile stations, wherein said decision on said size of said region is decided by said transmitter, wherein said transmitters can communicate said channel quality feedback with each other.

13. The method as in claim 4, wherein a size of said region is decided based on a channel quality feedback received at said plurality of transmitters from said plurality of mobile stations, wherein said decision on said size of said region is decided by a master controller, wherein said master controller receives said channel quality feedback from said plurality of transmitters.

14. The method of claim 1, wherein said one or more sub carriers are adjacent to each other in at least one of time and frequency.

15. The method of claim 1, wherein said incoming modulation symbols comprises at least one of pilot symbols, data symbols and control symbols.

16. The method of claim 1, wherein said synchronized transmission for encoded modulation symbols is at least one of an uplink transmission and a downlink transmission.

17. The method of claim 1, wherein said network uses one of Orthogonal Frequency Division Multiple Access (OFDMA) modulation scheme or a Single Carrier Frequency Division Multiple Access (FDMA) modulation scheme.

18. The method of claim 1, wherein said complex conjugation is applied on said incoming modulation symbols when a repetition factor is 2.

19. The method of claim 1, wherein said one or more subcarriers belong to one of a single Resource Block (RB) or a plurality of resource blocks (RB).

20. A wireless telecommunications network for mitigating interference, said wireless telecommunications network comprises:
    a controller configured to:
       receive a quality metric data from a plurality of mobile stations; and
       identify a set of mobile stations using said received quality metric;
    a precoder configured to:
       repeat incoming modulation symbols over one or more subcarriers for said identified set of mobile stations; and
       encode said repeated modulation symbols using at least one of complex conjugation and phase variation, wherein said encoding of said repeated modulation symbols is synchronized in a plurality of spatially separated transmitters; and said plurality of said spatially separated transmitters configured to transmit said incoming modulation symbols and said encoded modulation symbols in a synchronized transmission.

21. A wireless telecommunications network for mitigating interference, said wireless telecommunications network comprises:
    at least one precoder configured to:
        repeat incoming modulation symbols over one or more subcarriers for a set of identified mobile stations; and
        encode said repeated modulation symbols using at least one of complex conjugation and phase variation, wherein said encoding of said repeated modulation symbols is synchronized in a plurality of spatially separated transmitters;
    said plurality of said spatially separated transmitters configured to:
        receive a quality metric data from a plurality of mobile stations;
        forward received quality metric data to a master controller;
        receive a set of mobile stations that require interference mitigation from said master controller; and
        transmit incoming modulation symbols and said encoded modulation symbols in a synchronized transmission; and
    said master controller configured to:
        receive said quality metric data from said plurality of spatially separated transmitters;
        identify a set of mobile stations using said received quality metric; and
        notify said transmitters about said identified set of mobile stations.

* * * * *